(12) United States Patent
Dehkordi et al.

(10) Patent No.: US 11,662,591 B1
(45) Date of Patent: May 30, 2023

(54) DISPLAY SYSTEMS AND IMAGING SYSTEMS WITH DYNAMICALLY CONTROLLABLE OPTICAL PATH LENGTHS

(71) Applicant: BRELYON Inc., San Mateo, CA (US)

(72) Inventors: Barmak Heshmat Dehkordi, San Mateo, CA (US); Christopher Barsi, San Mateo, CA (US); I-Hung Ting, San Mateo, CA (US); Albert Redo Sanchez, San Mateo, CA (US); Alok Ajay Mehta, San Mateo, CA (US)

(73) Assignee: BRELYON Inc., San Mateo, CA (US)

( * ) Notice: Subject to any disclaimer, the term of this patent is extended or adjusted under 35 U.S.C. 154(b) by 0 days.

(21) Appl. No.: 17/810,567

(22) Filed: Jul. 1, 2022

(51) Int. Cl.
*G02B 27/01* (2006.01)
*G02B 27/10* (2006.01)

(52) U.S. Cl.
CPC ......... *G02B 27/0172* (2013.01); *G02B 27/10* (2013.01); *G02B 2027/011* (2013.01)

(58) Field of Classification Search
CPC .......... G02B 2027/011; G02B 27/0172; G02B 27/017; G02B 27/01; G02B 27/10
USPC ....................................................... 359/630
See application file for complete search history.

(56) References Cited

U.S. PATENT DOCUMENTS

| | | | |
|---|---|---|---|
| 6,384,982 B1 * | 5/2002 | Spitzer | G02B 27/0172 359/633 |
| 10,768,442 B1 | 9/2020 | Dehkordi | |
| 11,196,976 B2 | 12/2021 | Heshmat Dehkordi | |
| 2014/0126051 A1 * | 5/2014 | Amitai | G02B 27/0172 359/465 |
| 2014/0126052 A1 * | 5/2014 | Amitai | G02B 6/2766 359/641 |
| 2015/0277127 A1 * | 10/2015 | Amitai | G02B 5/045 359/641 |
| 2015/0293360 A1 * | 10/2015 | Amitai | G02B 6/003 359/633 |
| 2016/0187656 A1 * | 6/2016 | Amitai | G02B 27/283 359/633 |
| 2016/0195724 A1 * | 7/2016 | Levin | G02B 5/04 359/484.01 |
| 2016/0349518 A1 * | 12/2016 | Amitai | G02B 27/28 |
| 2017/0031163 A1 * | 2/2017 | Gao | G02B 25/001 |
| 2017/0315361 A1 * | 11/2017 | Gao | G02B 5/04 |
| 2018/0101012 A1 * | 4/2018 | Gao | G02B 5/04 |
| 2018/0299677 A1 * | 10/2018 | Gao | G02B 27/283 |
| 2019/0107722 A1 * | 4/2019 | Gao | G02B 27/0172 |
| 2020/0012109 A1 * | 1/2020 | Gao | G02B 27/283 |
| 2020/0150453 A1 | 5/2020 | Dehkordi | |
| 2020/0355918 A1 * | 11/2020 | Klug | G02B 27/4205 |
| 2021/0103160 A1 | 4/2021 | Dehkordi | |
| 2021/0356760 A1 | 11/2021 | Dehkordi | |
| 2021/0373338 A1 * | 12/2021 | Gao | G02B 27/0172 |
| 2022/0057647 A1 | 2/2022 | Khorasaninejad et al. | |

* cited by examiner

*Primary Examiner* — William R Alexander
(74) *Attorney, Agent, or Firm* — Perkins Coie LLP; Jordan Becker

(57) ABSTRACT

An optical subsystem for use in a display system or an imaging system comprises a plurality of reflective surfaces collectively arranged to provide variable control of device-internal path lengths of light coming to an imaging sensor or traveling a path to an eye of a viewer. The optical subsystem can be used to provide multiple images concurrently at different apparent depths as perceived by the user.

28 Claims, 24 Drawing Sheets

(22 of 24 Drawing Sheet(s) Filed in Color)

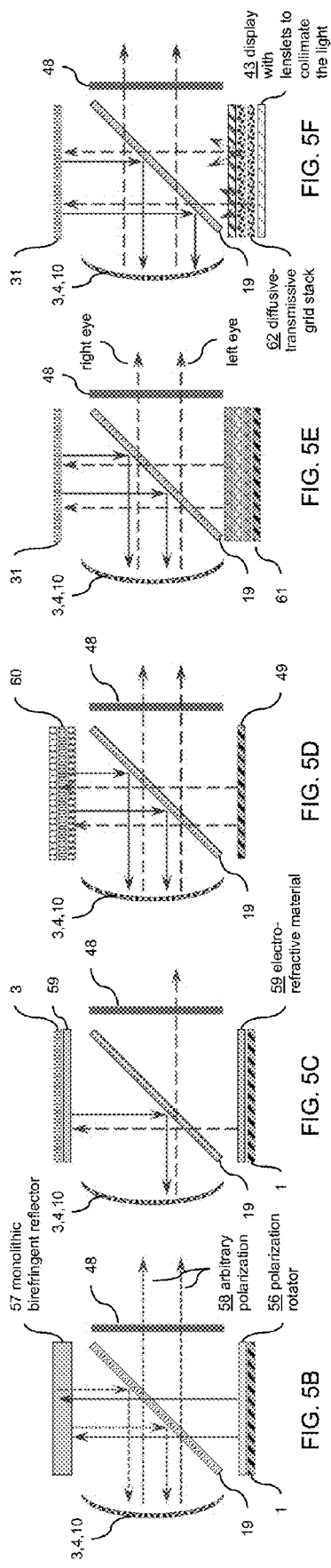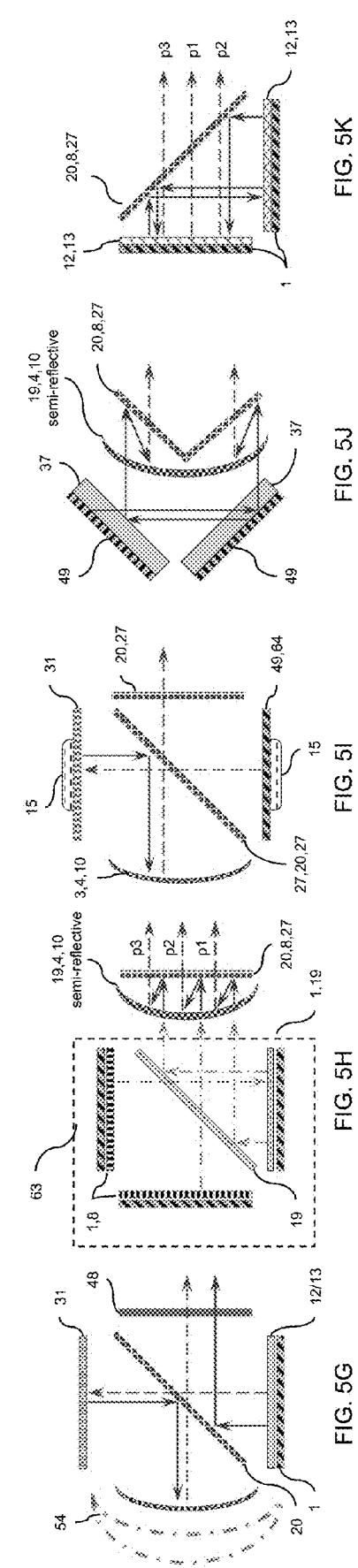

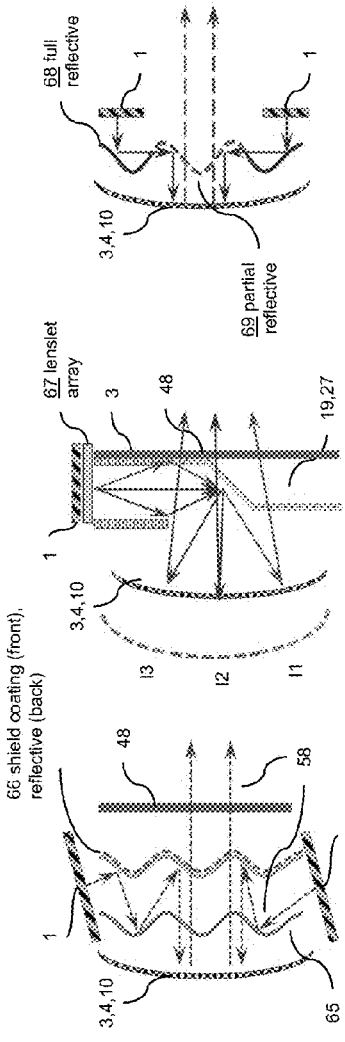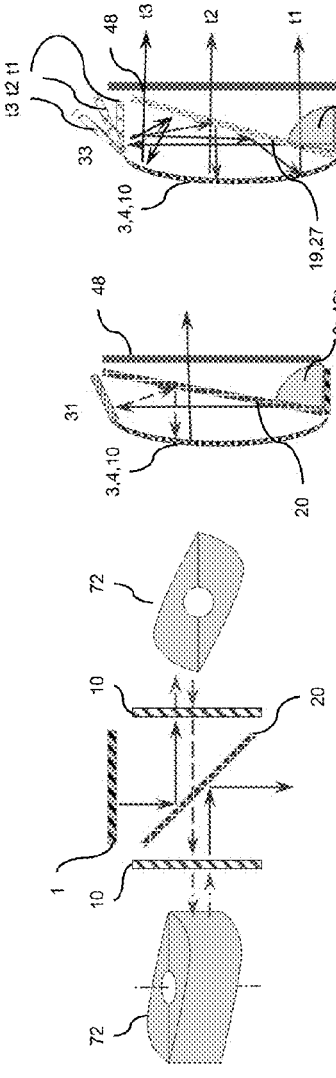

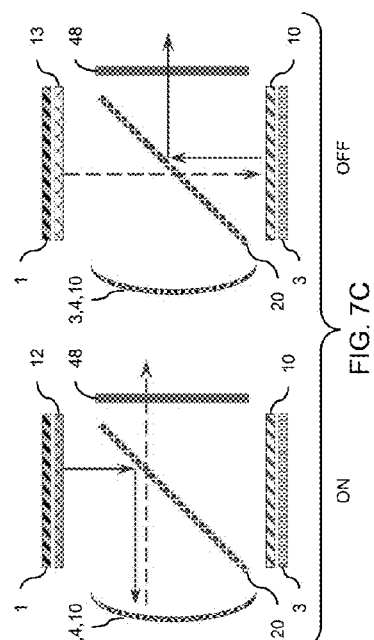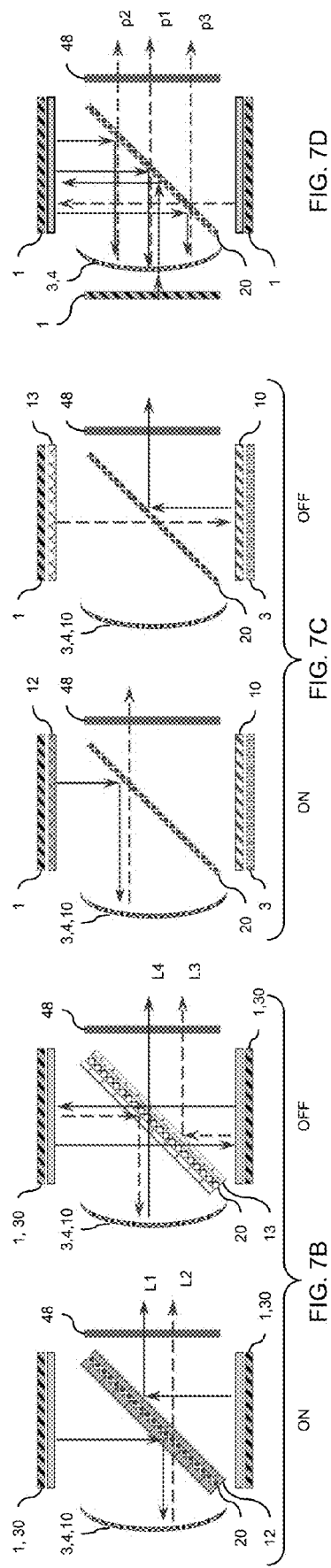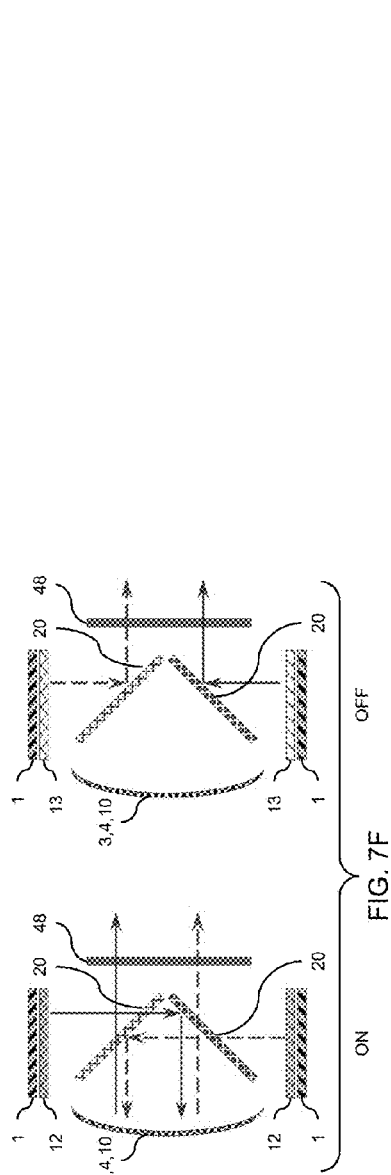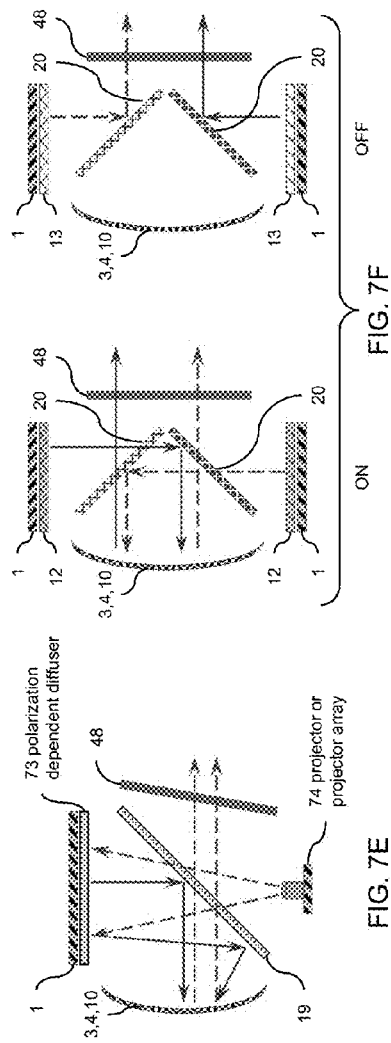
FIG. 7B  FIG. 7C  FIG. 7D  FIG. 7E  FIG. 7F

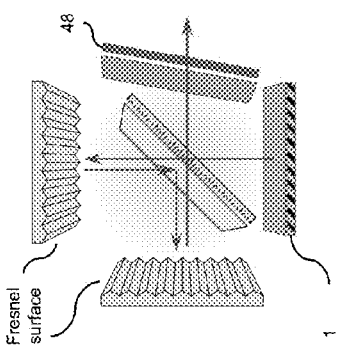
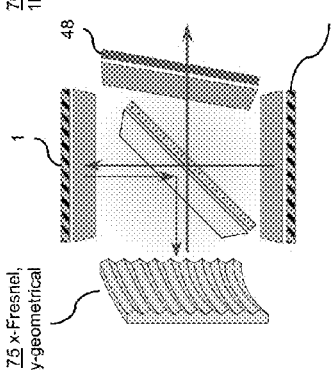
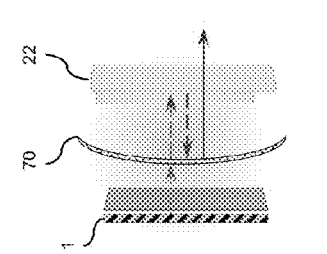
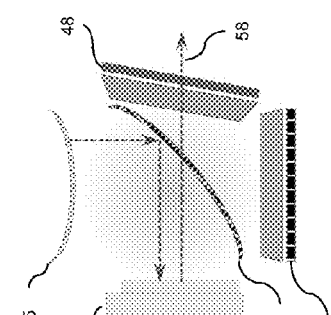
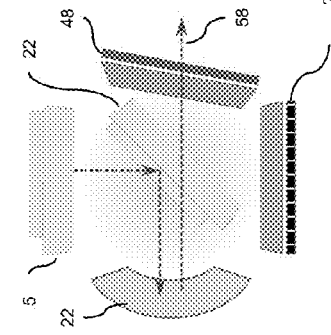
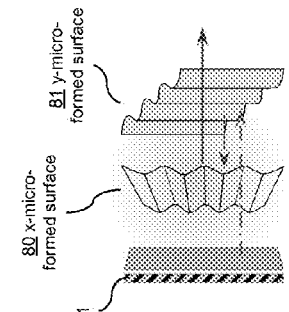
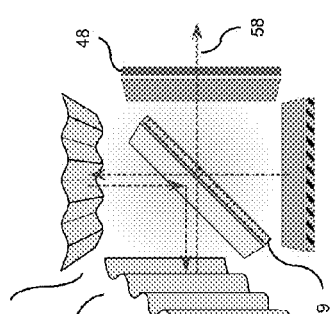
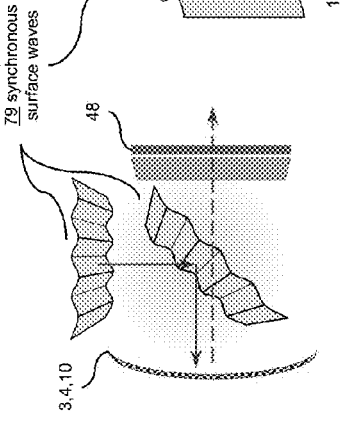
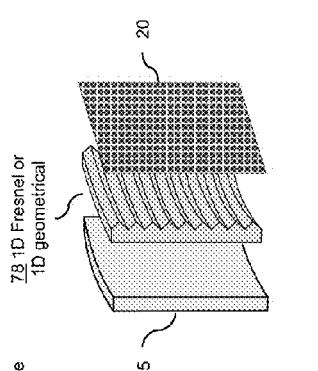

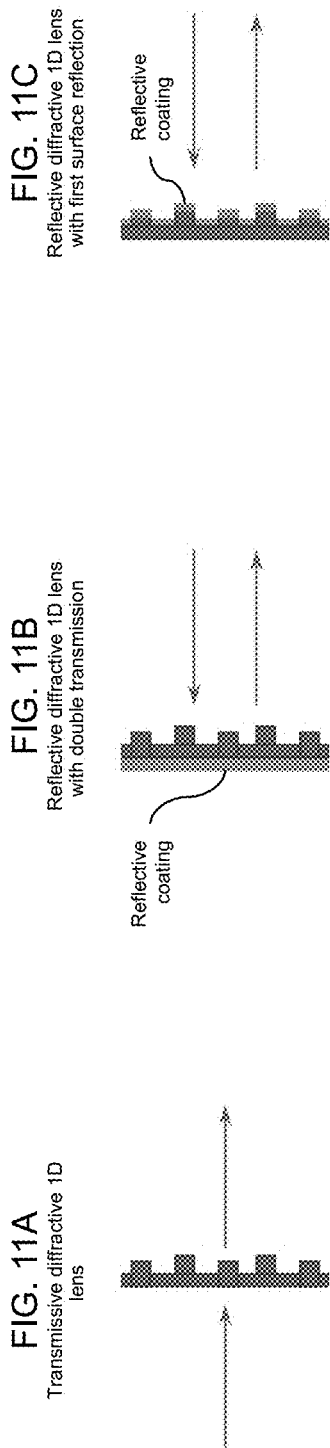

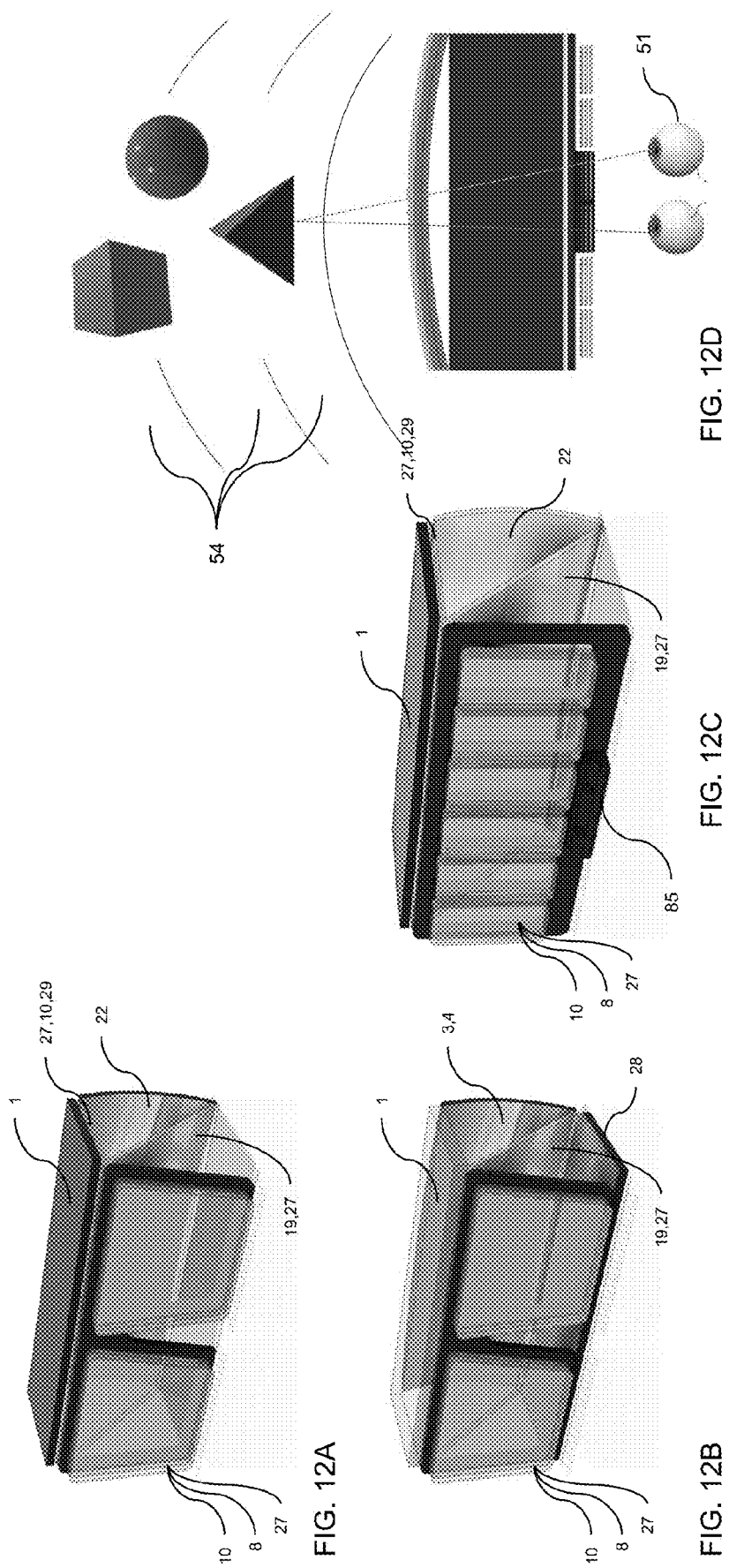

US 11,662,591 B1

DISPLAY SYSTEMS AND IMAGING SYSTEMS WITH DYNAMICALLY CONTROLLABLE OPTICAL PATH LENGTHS

TECHNICAL FIELD

This application generally relates generally to lightfield displays and imaging apparatuses, and more specifically, to dynamically controlling the optical path of light emitted within a lightfield display or imaging apparatuses to affect the image produced or captured thereby.

BACKGROUND

In today's society, there has been increasing movement towards more immersive light-field and/or autostereoscopic three-dimensional (3D) displays, due to advancement in electronics and microfabrications. Most current and common autostereoscopic 3D displays can require virtual reality (VR) headgear or similar devices. However, VR headgear can cause eye strain and other similarly-related fatigue issues. These issues occur due to two primary issues with current and common VR headgear. Firstly, most common and current VR headgear divide the image into two viewing zones in which parallax is extracted from those viewing zones and overlapped to procure a seemingly single, whole image. Secondly, most current and common VR headgear have the viewing zones too near to the user's eyes. Another issue with most current and common VR headgear is the binocular gaps in the image projected due to the images being fed into two separate viewing zones, one for each eye of the user with separate optics.

Recent advances in display technology include the use of concentric lightfield technology to create large field-of-view (FOV) immersive 3D displays. However, even the most recent display technologies face various design challenges, such as reducing the form factor of the display without sacrificing (or while increasing) the size of the headbox, reducing distortion, etc.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5A through 5K illustrate a set of side views of example embodiments the using the switchable stacks of FIG. 3A in multiple configurations and with various switchable elements.

FIGS. 6A through 6K illustrate a set of side views of example embodiments to produce the compressed displays from FIG. 3B or the fractional lightfield displays for increased headbox space and tessellated virtual images.

FIGS. 7A through 7F illustrate a set of side views of example embodiments using multiple seed panels from FIG. 3C with single- and higher-order FECs.

FIGS. 11A through 11C illustrate schematically the manufacturing of some subsampled diffractive elements.

FIGS. 12A through 12D illustrate varieties of headset displays that serve as examples of additional embodiments of the display system and its integration with stereoscopic display methods.

DETAILED DESCRIPTION

Figure 1:
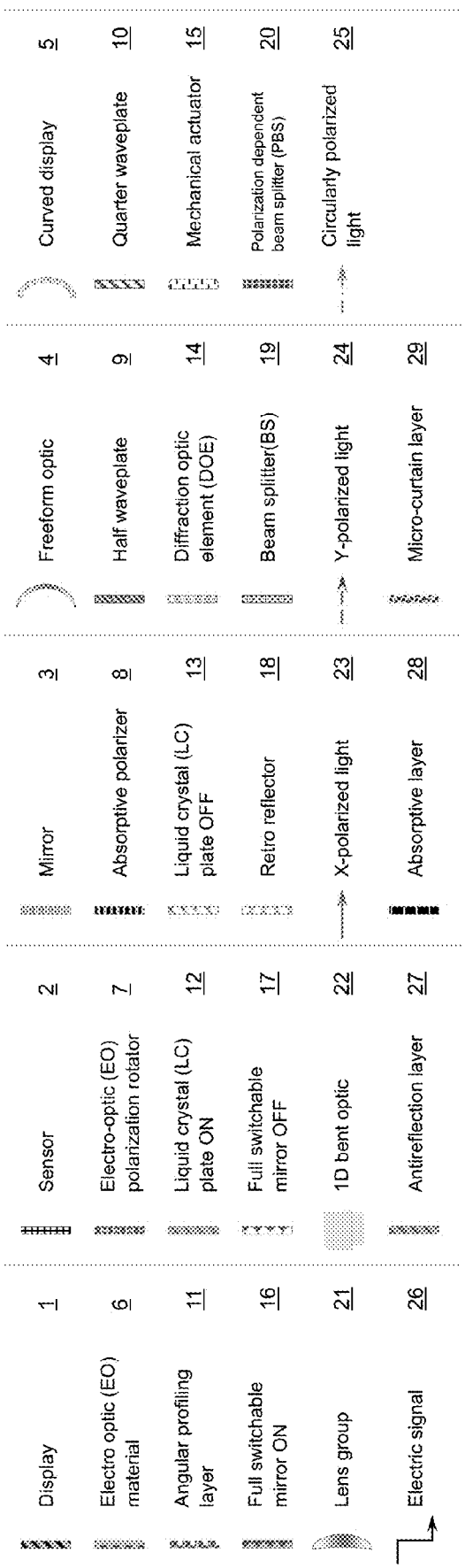
FIG. 1 illustrates a set of elements that can compose various embodiments of field evolving cavities (FECs) described in this disclosure.

In this description, references to an "embodiment," "one embodiment" or similar words or phrases mean that the feature, function, structure, or characteristic being described is an example. Occurrences of such phrases in this specification do not necessarily all refer to the same embodiment. On the other hand, the embodiments referred herein also are not necessarily mutually exclusive.

All illustrations and drawings describe selected versions of the techniques introduced here and are not intended to limit the scope of the techniques introduced here. All references to "user" or "users" pertain to either individual or individuals who would utilize the techniques introduced here.

Concentric lightfield displays provide depth perception to the users at the monocular level by manipulating optical wavefronts by using field evolving cavities (FECs). FECs are described in detail in U.S. Patent Application Publication Nos. 2020/0150453, 2021/0103160, 2021/0356760, and in U.S. Pat. No. 10,768,442, all of which are incorporated by reference herein in their entireties, and henceforth referred to herein as references [1], [2], [3] and [4], respectively. Concentric lightfield displays are also described in detail in at least reference [4]. This mechanism enables optical depth modulation, effectively eliminates the accommodation-vergence mismatch for comfortable viewing, and significantly reduces user eye stress and fatigue. The techniques introduced herein FECs with active-material layers, a shield layer, multiple seed display panels, and multiple one-dimensional (1D-1D) curved optical structures. These types of displays can provide tunable optical depth modulation and full or partial (fractional) lightfield signaling functionality, which reduce the overall system footprint and provide the ability to multiplex information in depth across the field of view with increased signal-to-noise performance. The term "one-dimensional" (1D) in this context refers to that characteristic by which an optic has optical focusing power in one dimension. The term "1D-1D curved" as used herein means an optical characteristic by which an optic has multiple separate layers of curvature that are orthogonal to each other. For example, a reflector can have Fresnel lensing that provides an effective curvature about a first axis, on top of a reflective structure that is physically curved along a second axis that is orthogonal to the first axis.

This approach can be contrasted with the four main existing lightfield display methods—super multi-view, computational, holographic, and multi-focal—each with its own associated strengths and weaknesses (see references [1], [2], [3] and [4]). Super multi-view lightfield displays can be realized in a compact form factor but are limited in resolution with a reduced and restricted viewable zone. Computational approaches provide a mechanism to increase the resolution but produce haze and suffer from temporal flickering artifacts. Typical issues using the holographic method involve significant color nonuniformity and fringing or specular artifacts. In contrast, multi-focal lightfield display methods can provide clean images but are typically bulky with a large form factor. Aside from these issues, all current lightfield display methods typically suffer from large bandwidth requirements, a reliance on expensive and/or advanced components—such as tunable lenses—that are not easily produced at scale, poor color uniformity, small field of view or viewable zone, small aperture, low brightness, haze and diffraction artifacts, limited depth range, lack of compatibility with existing display drivers, bulkiness, and the occasional necessity to wear specialized glasses. Correspondingly, these limitations and challenges have limited the adoption and production of lightfield displays in commercial and/or enterprise settings and applications. Based on these limitations, new techniques are desired that are more compact, manufacturable at lower cost, and able provide larger viewable zones more comfortably.

This disclosure introduces different lightfield display embodiments and systems using tunable, compressed FECs and fractional lightfield signaling. Introduced herein are four main architectures:

1) FEC cavity design for tuning optical depth in a fractional lightfield display, in which the depth is controlled in small increments by using a stack of switchable reflectors;

2) compressed design in which the optical path of the object to the curved reflector is increased while keeping the thickness of the apparatus thin;

3) multiple-display design to support multiple depth layers by using multiple individual displays on different sides of the optical cavity; and 4) alternate FEC embodiments using 1D-1D bent optical surfaces and diffractive optical elements (DOEs) to mimic 2D imaging effects for optical wavefront control by using components with relaxed manufacturing tolerances and complexity.

This disclosure then describes the content depth-layer mapping approach for both imaging and display applications of such cavities. It then discloses embodiments for each of the four above-mentioned architectures. This disclosure also describes the modulation of acoustic or mechanical waves onto 1D-1D architectures such that the composition of these mechanical waves, or macroformings, on the reflective surfaces create compound lensing effects to control the optical wavefront in different architectures of FECs. This disclosure also describes hybrid 1D-1D approaches such that the lensing effects or wavefront effects are created by geometrical forming on one dimension and is done by diffractive or refractive approaches in the other, perpendicular, dimension to provide an equivalent of two-dimensionally curved ("2D-curved") reflectors or surfaces (a "2D-curved" reflector is a reflector that has curvature about two orthogonal axes). It further discloses some applications of these embodiments for in-vehicle visualization apparatuses, hand watches and various other scenarios.

Nomenclature

In this disclosure, the term "arbitrarily engineered" means being of any shape, size, material, feature, type, kind, orientation, location, quantity, construction, composition, components, and arrangements of components with a single or array of components, that would allow the described technique or that specific component to fulfill the objective(s) and purpose(s) of the technique or that specific component.

In this disclosure, "lightfield" at a plane means a vector field that describes the amount of light flowing in every or several selected directions through every point in that plane. "Lightfield" is the description of angle and intensity of light rays traveling through or emitted from that plane. In this disclosure a fractional lightfield means a subsampled version of the full lightfield such that the full lightfield vector field is represented by a limited number of samples in different focal planes and/or angles.

In this disclosure, "depth modulation" means the change, programming, or variation of monocular optical depth of the display or image. "Monocular optical depth" is the optical depth that directly relates to the perceived distance between the user and the source of light. An ideal source of light emits light rays equally in all directions, and the collection of light rays can be understood to lie on sphere, called a wavefront, of expanding radius. When an emissive image (e.g., an illuminated object or a display) is moved farther away from an observer, the emitted light travels a longer distance, and the user observes a spherical wavefront of larger radius and correspondingly smaller curvature, i.e., the wavefront is viewed as flatter. This reduction in the curvature is perceived by the eye or camera as a deeper depth. Monocular optical depth does not require both eyes or stereopsis to be perceived. Evolution of a wavefront means changes in wavefront curvature because of optical propagation.

In this disclosure, the term "optically coupled" means one element being adapted to impart, transfer, feed, or direct light to another element directly or indirectly.

In this disclosure, the term "chief rays" means the center axis of the light cone that comes from a particular pixel or point in space.

In this disclosure, the terms "Field evolving cavity" and "FEC" mean a non-resonant (e.g., unstable) cavity that allows light to reflect back and forth within its reflectors to evolve the shape of the wavefront associated with the light in a physical space. One example of an FEC may comprise two or more half-mirrors or semi-transparent mirrors facing each other. As described herein, an FEC may be parallel to a display plane (in the case of display systems) or an entrance pupil plane (in the case of imaging systems). An FEC may be used for changing the apparent depth of a display or of a section of the display. In an FEC, the light bounces back and forth, or circulates, between the facets of the cavity. Each of these propagations is referred to as a "pass." For example, suppose there are two reflectors for the FEC, one at the light source side and one at the exit side. The first instance of light propagating from the entrance reflector to the exit reflector is called a forward pass. When the light or part of light is reflected back from the exit facet to the entrance facet, that propagation is called a backward pass, as the light is propagating backward toward the light source. In a cavity, a round trip occurs once the light completes one cycle and comes back to the entrance facet. FECs can have many different architectures, but the principle remains the same. An FEC is an optical architecture that creates multiple paths for light to travel, either by forcing light to go through a higher number of round trips or by forcing light from different sections of the same display to travel different distances before they exit the cavity. If the light exits the cavity perpendicular to the angle it entered the cavity, the FEC is referred to as an off-axis FEC or an "FEC with perpendicular emission."

In this disclosure, the term "round trips" denotes the number of times that light circulates or bounces back and forth between the entrance and exit facets or layers of a cavity.

In this disclosure, the "aperture of a display system" is the surface where the light exits the display system toward the exit pupil of the display system. The aperture is a physical surface, whereas the exit pupil is an imaginary surface that may or may not be superimposed on the aperture. After the exit pupil, the light enters the outside world.

In this disclosure, the "aperture for imaging systems" is the area or surface where the light enters the imaging system after the entrance pupil of the imaging system and propagates toward the sensor. The entrance pupil is an imaginary surface or plane where the light first enters the imaging system.

In this disclosure, the term "display" means any element that emits light that forms (at least in part) an image to be displayed to a user. Hence, the term "display" means an "emissive display," which can be based on any technology, including, but not limited to, liquid crystal displays (LCD), thin-film transistor (TFT), light emitting diode (LED), organic light emitting diode arrays (OLED), active matrix organic light emitting diode (AMOLED), plastic organic light emitting diode (POLED), micro organic light emitting diode (MOLED), or projection or angular-projection arrays on flat screens or angle-dependent diffusive screens or any other display technology and/or mirrors and/or half mirrors and/or switchable mirrors or liquid crystal sheets arranged and assembled in such a way as to exit bundles of light with a divergence apex at different depths or one depth from the core plane or waveguide-based displays. Unless stated otherwise, the display may be an autostereoscopic display that provides stereoscopic depth with or without glasses. It might be curved or flat or bent or an array of smaller displays tiled together in an arbitrary configuration. The display may be a near-eye display for a headset, a near-head display or far-standing display. The application of the display does not impact the principle of the techniques introduced here.

In this disclosure, the "angular profiling" means the engineering of light rays to travel in specified directions. It may be achieved by holographic optical elements (HOEs), diffractive optical elements (DOEs), lenses, concave or convex mirrors, lens arrays, microlens arrays, aperture arrays, optical phase masks or amplitude masks, digital mirror devices (DMDs), spatial light modulators (SLMs), metasurfaces, diffraction gratings, interferometric films, privacy films, or other methods. The intensity profiling may be achieved by absorptive or reflective polarizers, absorptive coatings, gradient coatings, or other methods. The color or wavelength profiling may be achieved by color filters, absorptive notch filters, interference thin films, or other methods. The polarization profiling might be done by metasurfaces with metallic or dielectric materials, micro- or nano-structures, wire grids, absorptive polarizers, quarter-wave plates, half-wave plates, 1/x-wave plates, or other nonlinear crystals with an isotropy, or spatially-profiled waveplates.

In this disclosure, the terms "active design," "active components," or, generally, "active" mean a design or component that has variable optical properties that can be changed with an optical or electrical signal. Electro-optical (EO) materials include liquid crystals (LC); liquid crystal as variable retarder (LCVR); or piezoelectric materials/layers exhibiting Pockel's effects (also known as electro-optical refractive index variation)—such as lithium niobate (LiNbO3), lithium tantalate (LiTaO3), potassium titanyl phosphate (KTP), strontium barium niobate (SBN), and β-barium borate (BBO)—with transparent electrodes on both sides to introduce electric fields to change the refractive index. The EO material can be arbitrarily engineered. Passive designs or components are referred to as designs that do not have any active component other than the display.

In this disclosure the "pass angle" of a polarizer means the angle at which the incident light normally incident to the surface of the polarizer can pass through the polarizer with maximum intensity. Two items that are "cross polarized" are such that their polarization statuses or orientations are orthogonal to each other. For example, when two linear polarizers are cross polarized, their pass angles differ by 90 degrees.

In this disclosure, "reflective polarizer" means a polarizer that allows the light that has its polarization aligned with the pass angle of the polarizer to transmit through the polarizer and that reflects the light that is cross polarized with its pass axis. A "wire grid polarizer" (a reflective polarizer made with nano wires aligned in parallel) is an example of such polarizer. An "absorptive polarizer" is a polarizer that allows the light with polarization aligned with the pass angle of the polarizer to pass through and that absorbs the cross polarized light. A "beam splitter" is a semi-reflective layer that reflects a certain desired percentage of the intensity of the light, which can be dependent on its polarization, and passes the rest of the light. A simple example of a beam splitter is a glass slab with a semi-transparent silver coating or dielectric coating on it and that allows 50% of the light to pass through it, and reflects the other 50%.

In this disclosure, an "imaging sensor" may use arbitrary image sensing technologies to capture light or a certain parameter of light that is exposed onto it. Examples of such arbitrary image sensing technologies include complementary-symmetry metal-oxide-semiconductor (CMOS), single photon avalanche diode (SPAD) array, charge-coupled Device (CCD), intensified charge-coupled device (ICCD), ultrafast streak sensor, time-of-flight sensor (ToF), Schottky diodes, or any other light or electromagnetic sensing mechanism for shorter or longer wavelengths.

As used herein, "imaging system" means any apparatus that acquires an image that is a matrix of information about light intensity and/or its phase, temporal, spectral, polarization, entanglement, or other properties used in any application or framework. Imagining systems include cellphone cameras, industrial cameras, photography or videography cameras, microscopes, telescopes, spectrometers, time-of-flight cameras, ultrafast cameras, thermal cameras, or any other type of imaging system.

In this disclosure, the term "macroforming" means shaping the geometry/curvature of an optical element's surface or surfaces (in contrast with microforming, which creates subwavelength structure).

The techniques introduced here build upon certain aspects of the previously described display systems (see references [1], [2], [3] and [4]), which generate a high-quality virtual image, which may be a 2D, stereoscopic 3D, and/or multifocal image, where the display system has an intended (designed) viewing point for the human viewer that is at least 10 cm from the display (in contrast with conventional head-mountable displays (HMDs)). The techniques introduced here extend earlier techniques that produce a single, contiguous lightfield that enables simultaneous detection of monocular depth by each eye of the human viewer, where the monocular depth can be greater than the actual distance of the display from the human viewer and provides an apparent size of the display (as perceived by the human viewer) that is larger than the actual size of the display when the human viewer is located at the intended viewing point. With the techniques introduced here, the accessible monocular depth is also dynamically tunable in terms of depth location and profile, and the number of depth layers created across the user field of view, in contrast with current autostereoscopic displays, is not fixed at the physical location of the surface of the display panel. Note that any of the techniques introduced below can be adapted or modified to create an imaging system (e.g., a camera system) capable of creating multi-layer, multi-zoomable images; this can be accomplished by replacing the active display element(s) (e.g., LEDs or similarly-purposed elements) with one or more optical sensors (e.g., CCDs or similarly-purposed elements), while otherwise retaining the same physical/optical configurations described below.

In some embodiments, a display system in accordance with the techniques introduced here is designed to be positioned about 20 cm from the viewer's eyes and to provide an apparent display size (i.e., as perceived by the human viewer) of approximately 100 inches diagonally, where 10% of the peripheral virtual screen at the edges of the field of view has different modulated image depths than the central region, or where multiple depth levels are present at different parts of the field of view. In this context, "horizontally" means parallel to an imaginary line that passes through the geometric centers of the human viewer's two eyes when the human viewer is viewing the display in the normal (intended) manner.

The techniques introduced here allow production of a concentric light field with monocular-to-binocular hybridization, adding depth modulation tunability and fractional lightfield signaling capabilities and using compressed FEC embodiments with 1D-1D and DOE components to reduce manufacturing complexity and to decrease system size. The term "concentric light field" (also called "curving light field") as used herein means a light field in which, for any two pixels of the display at a fixed radius from the viewer (called "first pixel" and "second pixel"), the chief ray of the light cone emitted from the first pixel in a direction perpendicular to the surface of the display at the first pixel intersects with the chief ray of the light cone emitted from the second pixel in a direction perpendicular to the surface of the display at the second pixel. A concentric light field produces an image that is focusable to the eye at all points, including pixels that are far from the optical axis of the system (the center of curvature), where the image is curved rather than flat, and the image is viewable within a specific viewing space (headbox) in front of the lightfield.

FIG. 1 shows a number of basic "building block" components of the embodiments discussed herein. These components can be arbitrarily engineered. Element 1 is the schematic representation of an emissive display. Element 2 is the representation of a sensor, which can be an optical sensor, a camera sensor, a motion sensor or generally an imaging sensor. Element 3 is the schematic representation of a mirror, which can be a first-surface mirror, or second-surface mirror, or generally any reflective surface, Element 4 is a freeform optic; this element represents any freeform optic, convex or concave or neither, expressed with spherical, elliptical, conjugate, polynomial, hyperbolic or any other convex or concave or arbitrary function. Element 5 is the representation of curved display. Element 6 is the representation of an electro-optic material such as liquid crystals (LC). Element 7 represents an electro-optical (EO) polarization rotator such that by variation of signal voltage, a linear polarization can be rotated to desired angle. Element 8 is an absorptive polarizer such that one polarization of the light passes through, and the perpendicular polarization of light is absorbed.

Element 9 is a half-wave plate (HWP), which produces a relative phase shift of 180 degrees between perpendicular polarization components that propagate through it. For linearly polarized light, the effect is to rotate the polarization direction by an amount equal to twice the angle between the initial polarization direction and the axis of the waveplate. Element 10 is quarter quarter-wave plate (QWP), which produces a relative phase shift of 90 degrees. It transforms linearly polarized light into circularly polarized light, and it transforms circularly polarized light into linearly polarized light.

Element 11 is an angular profiling layer, which is an arbitrarily engineered layer to produce a specified angular distribution of light rays.

Element 12 is a liquid crystal (LC) plate that is switched "ON." In this state, the LC plate rotates the polarization of the light that passes through it. Element 13 is an LC plate that is switched "OFF," such that in this OFF state the state of the light polarization is unchanged upon transmission through the LC plate.

Element 14 is a diffractive optical element (DOE), which has microstructure to produce diffractive effects. The DOE can be of any material.

Element 15 is a mechanical actuator that can physically move the elements to which is connected via an electrical or other types of signals.

Element 16 is a full switchable mirror in the "ON" configuration, and element 17 is a full switchable mirror in the "OFF" configuration. When the switchable mirror is ON, it is reflective. When it is OFF, it is transparent. The mirror can also be in a semitransparent state.

Element 18 is a retroreflector, which is a mirror that reflects light rays in the exact same directions along which they are incident. The retroreflector can be fabricated with microstructure such as microspheres or micro corner cubes or metasurface stacks, or it can be a nonlinear element.

Element 19 is a beam splitter, which partially reflects and partially transmits light. The ratio of reflected light to transmitted light can be arbitrarily engineered.

Element 20 is a polarization-dependent beam splitter (PBS). It reflects light of one polarization and transmits light of the orthogonal polarization. A PBS can be arbitrarily engineered and made using reflective polymer stacks or nanowire grids or thin film technologies.

Element 21 is a lens group, which includes one or multiple lenses of arbitrary focal length, concavity, and orientation.

Element 22 is a one-dimensional (1D) bent optic. It is a structure that is curved or arbitrarily engineered in one direction but is uniform in the perpendicular direction.

Element 23 represents a light ray that is x-polarized. Its polarization direction is in the plane of the page of side-view sketches. Element 24 represents a light ray that is y-polarized, orthogonal to Element 23. Its polarization direction is perpendicular to plane of side-view embodiment sketches. Element 25 represents a light ray that is circularly polarized. Such light contains both x- and y-polarized light such that the two components are out of phase by 90 degrees, and the resulting polarization direction traces out a circle as the light propagates. The circular polarization can be clockwise or right circular polarization (RCP) or counter clockwise or left-handed circular polarization (LCP).

Element 26 represents an electrical signal that is used in the electrical system that accompanies the display system to modulate the optical elements or provide feedback to the computer.

Element 27 is an antireflection (AR) layer that is designed to eliminate reflections of light incident on its surface. Element 28 is an absorptive layer that absorbs all incident light. Element 29 is a micro-curtain layer that acts to redirect light into specified directions or to shield light from traveling in specified directions. A micro curtain can be made by embedding thin periodic absorptive layers in a polymer or glass substrate, or it can be made by fusing thin black coated glass and cutting cross-sectional slabs.

Figure 2A:
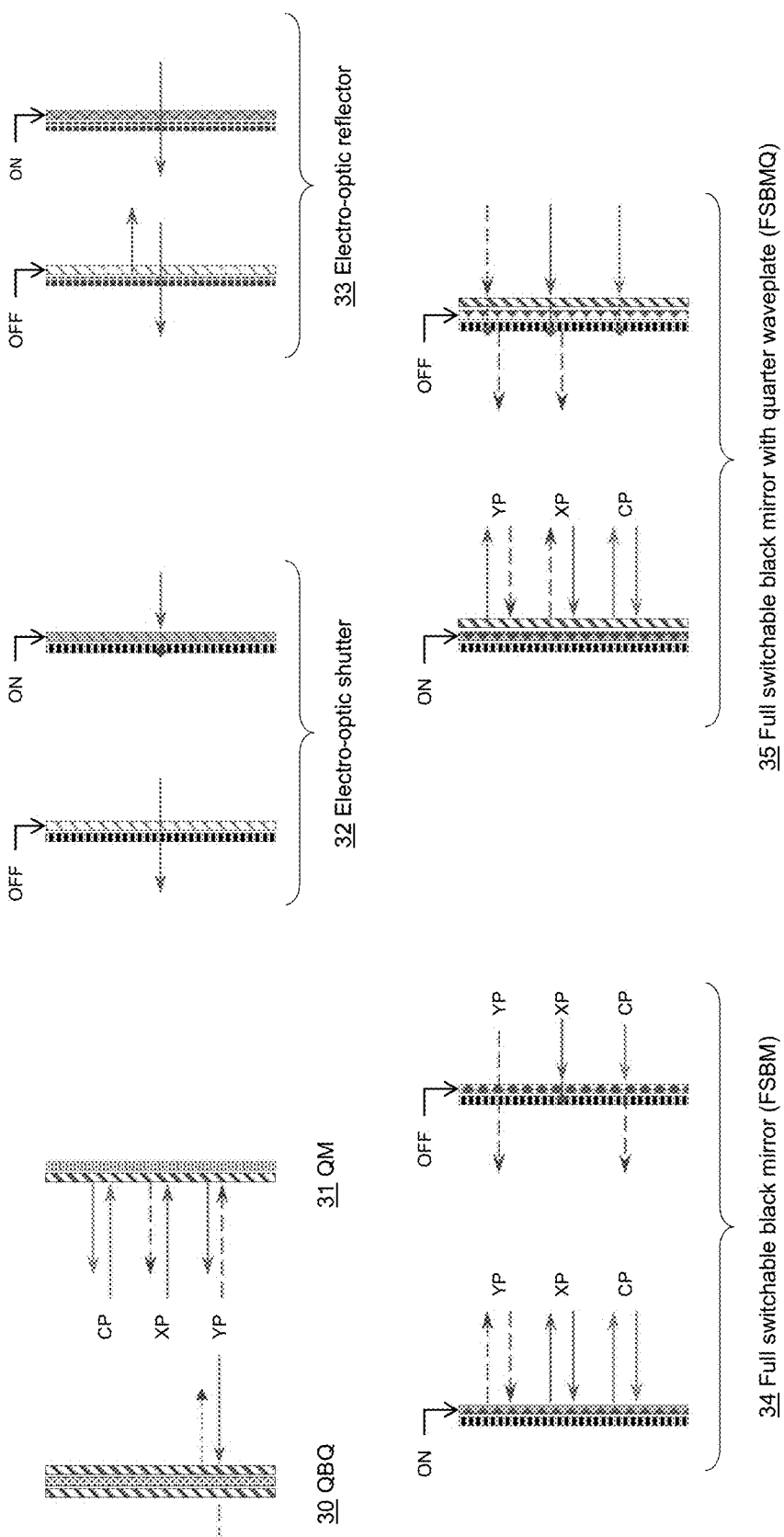
FIG. 2 illustrates various arrangements of the elements from FIG. 1 to produce different architectures of the FEC embodiments described herein.

The basic elements in FIG. 1 can be combined to produce the functional elements or subassemblies or sub-systems shown in FIG. 2. In FIG. 2A, element 30 (QBQ) comprises a QWP, beam splitter, then another QWP. Element 31 (QM) comprises a QWP layered on top of a mirror. It reflects all light, and it converts x-polarized light into y-polarized light and y-polarized light into x-polarized light. It does not change circularly polarized light.

Element 32 is an electro-optic shutter, which includes an LC layer and an absorptive polarizer. When the LC is ON, it rotates the polarized incident light such that it is aligned perpendicular to the absorptive polarizer and is absorbed by it. When the LC layer is OFF, it leaves the polarization unchanged and parallel to the absorptive polarizer which transmits it. Element 33 is an electro-optic reflector, which includes an LC layer and a PBS. When the LC layer is ON, it rotates the polarization such that it aligned along the transmit orientation of the PBS. When the LC layer is OFF, the light passing through it is aligned such that it is reflected by the PBS.

Element 34 is a full switchable black mirror (FSBM). In the ON state, the full switchable mirror is on and reflects light of all polarizations. In the OFF state, the switchable layer and absorptive layer together extinguish x-polarized light, transmits y-polarized light, and transmits only the y-component of circularly polarized light. Element 35 is a full switchable black mirror with quarter-wave plate (FSBMQ) and includes a FSBM with an added QWP layer. In the ON state, it reflects all light and interchanges x-polarized with y-polarized light. It reflects circularly polarized light unchanged. In the OFF state it extinguishes circularly-polarized light, transmits y-polarized light, and coverts x-polarized light into y-polarized light and transmits the result.

Figure 2B:
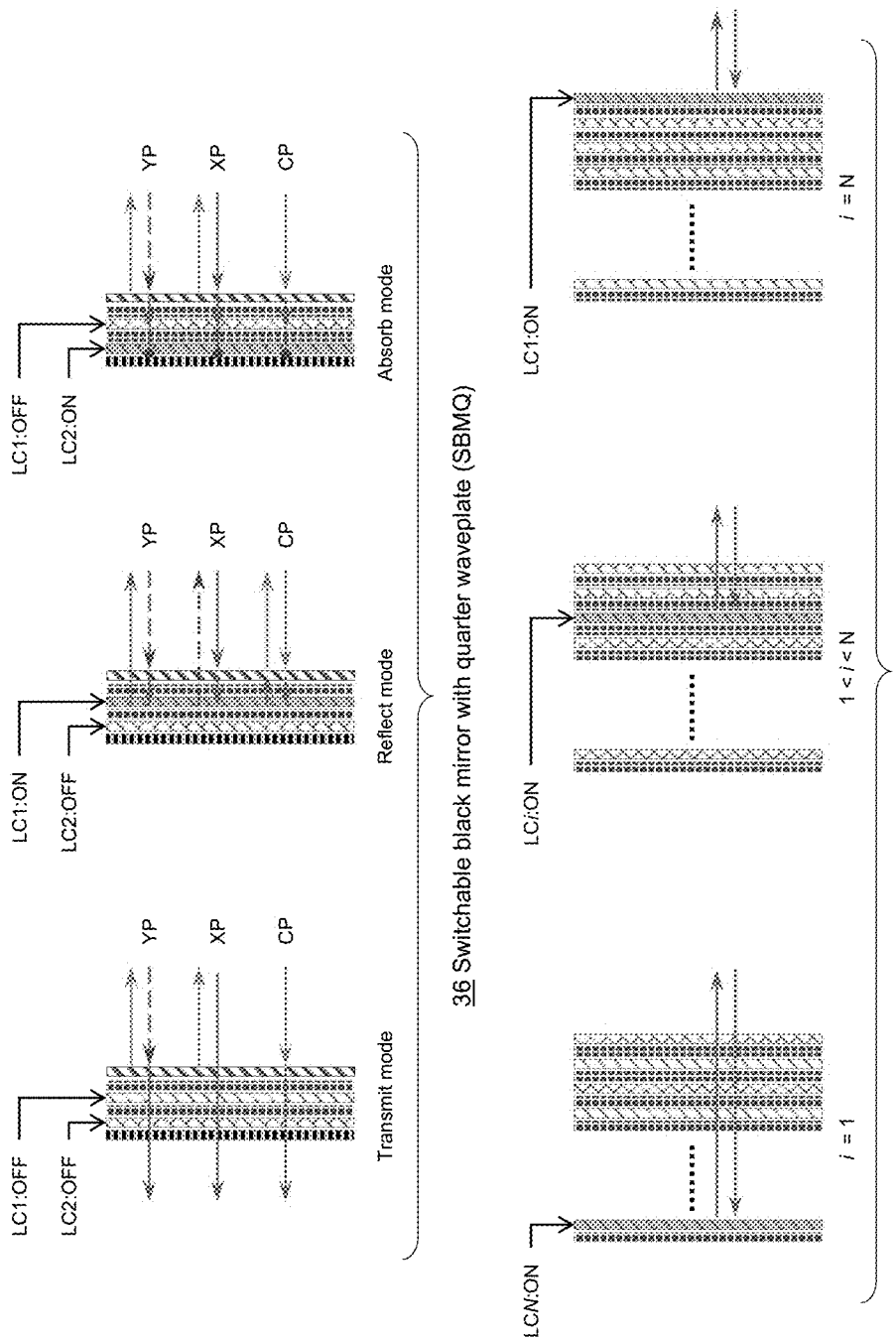

Shown in FIG. 2B are two switchable reflective stacks. Element 36 is a switchable black mirror with (SBMQ) including a QWP, followed by two alternating layers of LC and PBS, and one absorptive polarizer. The difference between full switchable mirror (FSBMQ) and switchable mirror (SBMQ) is the dependency of reflectivity to polarization. In the former, the full switchable mirror, the total reflectivity of the material is changing, agnostic to the polarization of the incident light, whereas the latter object allows for a polarization-dependent reflectivity.

For element 36, when both LC layers are OFF (transmit mode), all incident polarizations transmit an x-polarized component. When the first LC layer is ON and the second OFF (reflect mode), circularly polarized light is reflected unchanged, y-polarized light is reflected as x-polarized light, and x-polarized light is reflected as y-polarized light. When the first LC layer is OFF and the second LC is ON (absorb mode), all the incident light strikes the absorptive layer and is extinguished, and no light is transmitted through the layers.

Element 37 is an electro-optical reflector stack (EORS), including a stack of N alternating PBS and LC layers. All but one LC layer are in the OFF state, and the LC layer that is in the ON state reflects the incident x-polarized light. All other layers transmit the light. By varying which LC layer is in the ON state, the EORS modulates the optical depth or optical path or the length that the light has to travel through the stack before it is reflected by a cross-polarized PBS layer next to the ON LC layer.

Figure 2C:
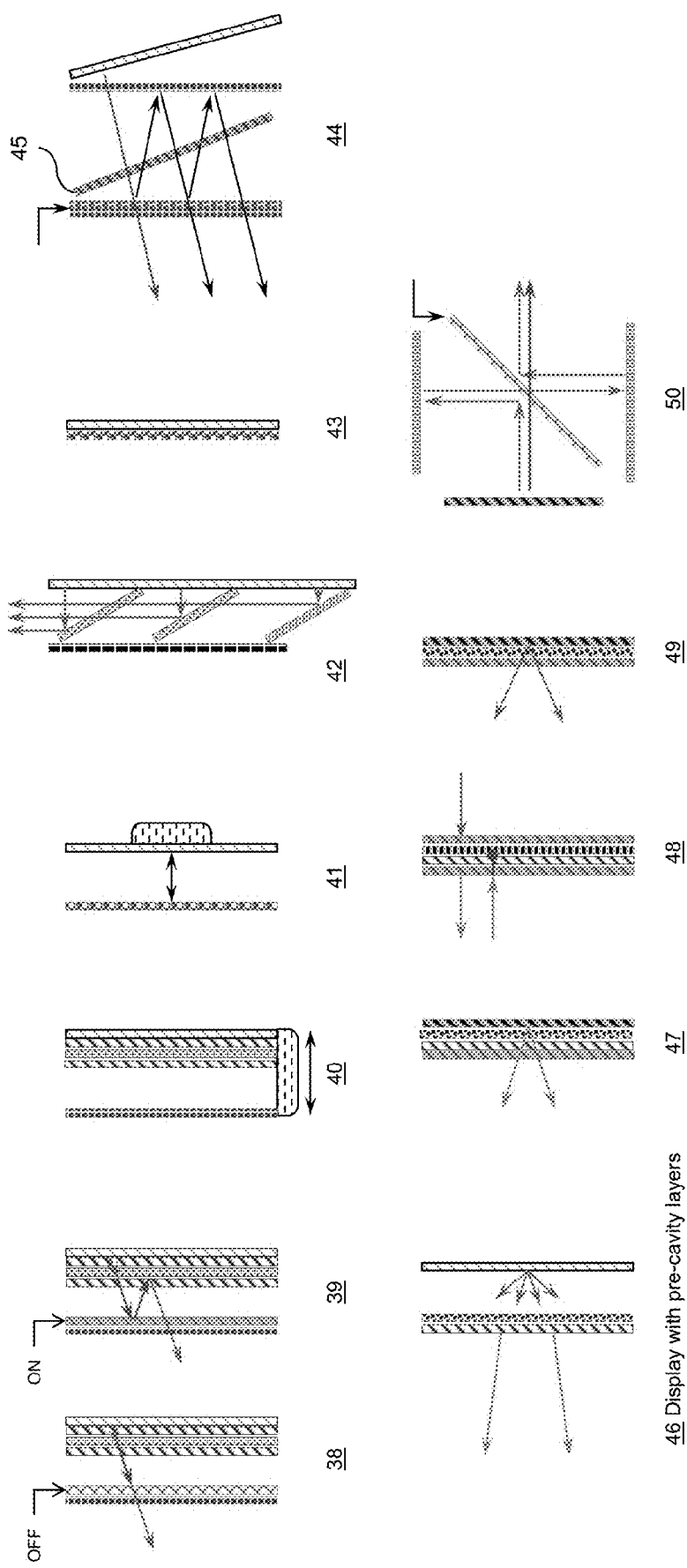

Shown in FIG. 2C are combinations of elements that form a variety of field evolving cavities (FEC) or layer stacks that can be used as subsystems for architectures explained throughout the disclosure. Elements 38 and 39 are OFF and ON states, respectively, of a display and QBQ followed by an electro-optic reflector. Here, in the OFF state, the light directly exits the aperture. In the ON state, the light is forced to travel one round trip in the cavity, and the displayed image appears to be deeper compared to the actual location of the display. Element 40 is a display followed by a QBQ and a PBS set on a mechanical actuator. The actuator shifts the set of layers to create longer or shorter optical path lengths for the light. Element 41 is a mechanical actuator fixed to a display. The actuator can shift or macroform the display relative to an angular profiling layer to force the light to change directionality or to become more or less collimated. In some embodiments, the angular profiling layer might be a lenslet array such that the mechanical movement of the display changes the object distance and therefore impact the collimation. In some embodiments, the display might be macroformed, meaning it may have mechanical waves or bends induced onto it by the mechanical actuators so that the directionality or collimation of the light that comes out of the angular lenslet array is impacted in a desired way.

In some embodiments, the display might be mechanically shifting, because of the actuator's motion along a translational axis, again to impact the directionality of the exit light from the apertures. The mechanical actuation mechanism might be arbitrarily engineered. In some embodiments, the mechanical actuator might be an array of ultrasonic transducers; in some embodiments, the mechanical translation might be done by a high rotation-per-minute brushless motor; in some embodiments, the mechanical movements might be delivered via a piezo- or stepper motor-based mechanism.

Element 42 is a cavity that includes a display that is partitioned into segments. Light from the bottom segment is reflected by a mirror, and light from the upper segments are reflected by subsequent beam splitters. An absorptive layer absorbs unwanted stray light. This is an example of an off-axis FEC. The FEC can be arbitrarily engineered to represent desired number of layers (see references [1], [2], [3] and [4]).

Element 43 is a display layer followed immediately by an angular profiling layer. The angular profiling layer might be a lenticular lens array to provide stereopsis to the viewer, or it might be a lenslet array or any other angular profiling layer to provide autostereoscopic 3D or provide different images to different angles.

Element 44 is an angled display layer, followed by a cavity with an internal polarization clock whose ends are composed of PBS layers. In between the PBS layers is a birefringent layer 45 such that different angles of propagation result in different retardation of polarization. The shutter layer at the aperture is tuned into a desired polarization so that only one of the round trips are allowed to exit the cavity, and the transmitted light has traveled a desired optical path or depth. This is a representation of coaxial FECs with polarization clocks and segmented gated apertures with desired gating mechanisms [2,3].

Element 46 is a display followed by a micro-curtain layer and a QWP to act as pre-cavity optics. This allows desired profiling of the light of the display. The pre-cavity optics can adjust the polarization or angular distribution or other properties of the light entering the cavity. Element 47 is of a stack of layers: a display layer, a QWP, a micro-curtain layer, and an antireflection layer. This subsystem is used in many other disclosed systems and is categorized as a display. The micro curtain can be arbitrarily engineered, and it allows for control of the directionality of the light and the visibility of the display. The AR layer allows for reduction of ambient or internal reflections of the systems that use this subcomponent. Element 48 is a sub-assembly that includes a transparent substrate that has an AR coating and an absorptive polarizer on one side facing the user and outside world, and another AR coating or film and a QWP on the side that faces the display from which light exits. In this disclosure, 48 is referred as a shield layer. Element 49 is a sub-assembly of a display with micro curtain layer and an AR coating on top. Element 50 shows a sub-assembly that includes two mirrors on the top and bottom, a display at the back, and an angled PBS with LC in the middle such that the electronic signal to the LC can change the length that the light must travel before it exits the cavity. In some embodiments, there might be a stack of such angled PBS-on-LC splitters such that the length of the light travel can be programmed or controlled in multiple steps. In some embodiments, the mirror might be a QM to rotate the polarization of the light. In some embodiments, the reflectors can be curved and parabolic to give extended depth.

Note that certain features described below are constructed from the basic "building block" components shown in FIG. 1 and defined above; these may be referred to as "compound" or "multi-layered" features. Such compound or multi-layered features may be referred to below and in subsequent figures with a name and corresponding reference numeral designating the feature as a whole (e.g., the semi-reflective optic (110) in FIG. 3A), and may also be referred to in this description by reference to their individual constituent ("building block") components or layers (e.g., the semi-reflective optic (110) may also be referred to as a beam splitter (19) with antireflective coating (27)). These alternative ways of referring to the same features will be readily apparent to and understood by those skilled in the art.

FIGS. 3A through 3D depict a set of example embodiments that represent four architectures to provide tunable depth modulation in concentric near-head lightfield displays for first-order and higher-order FEC cavity designs. FIGS. 3E through 3H are views of the embodiments of FIGS. 3A through 3D, respectively, in which the multi-layered components are shown in "exploded" form. These architectures provide multiple layers of depth and eye comfort by using longer focal lengths and increasing the object distance to the lensing mechanism. They also provide compact architectures such that the aspect ratio from the side is not a square but rather an elongated, tall rectangle. FEC cavities have a set of preparation optics that can in turn have several alternative embodiments.

Figure 3B:
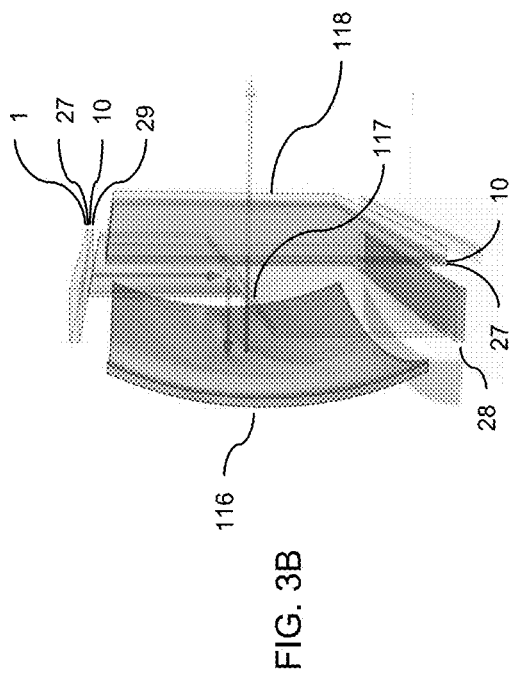
FIG. 3B illustrates a perspective view of an example embodiment including a compressed cavity.
Figure 3D:
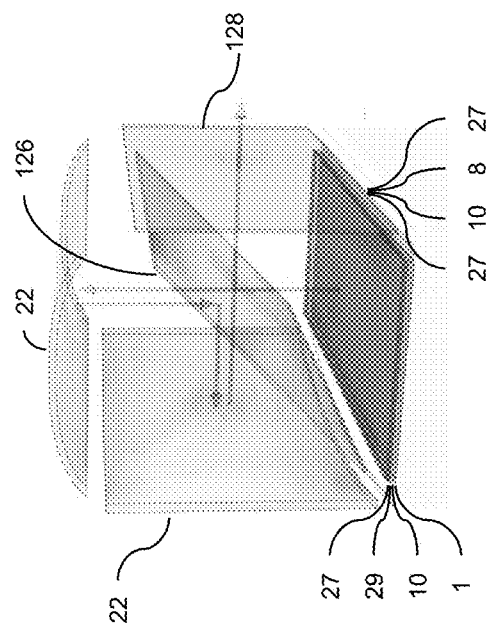
FIG. 3D illustrates a perspective view of an example embodiment including a 1D-1D geometry.
Figure 3A:
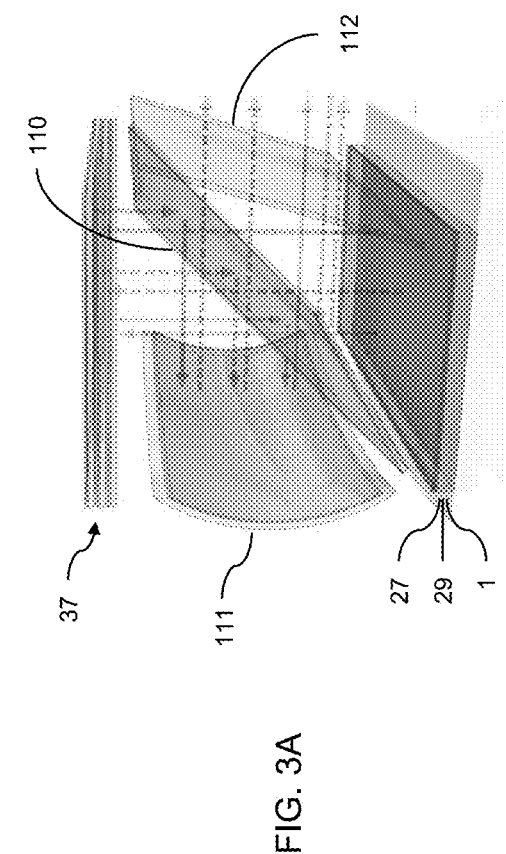
FIG. 3A illustrates a perspective view of an example embodiment including multiple switchable stacks for depth modulation.
Figure 3C:
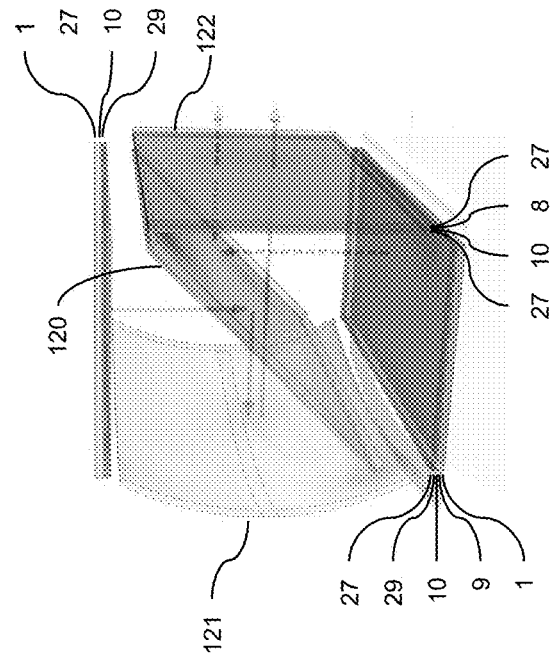
FIG. 3C illustrates a perspective view of an example embodiment including multiple seed display panels.
Figure 3E:
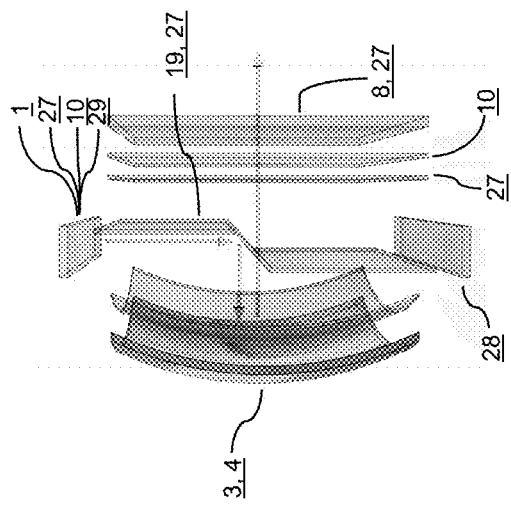
FIG. 3E is another view of the embodiment of FIG. 3A in which the multi-layered components are shown in "exploded" form.

FIGS. 3A and 3E each illustrate a perspective view of the tunable concentric near-head lightfield display embodiment where active, switchable reflectors are used to terminate one end of the cavity and can be electronically addressed to tune to the resulting level of induced optical depth modulation. For example, in this embodiment the light is originated from an emissive display or array of displays (1). Then the light from the display (1) passes through a set of pre-cavity optics (29, 27) to condition the light before going through an FEC with fixed or switchable optical elements (37) that determines and tunes the optical depth in desired increments. The light then is reflected back by the switchable optical elements 37 to a semi-reflective optic 110 made of internal passive optical elements (19, 27) in the cavity, which reflects the light back toward a 2D-curved (freeform) back reflector (111). The back reflector (111) can be made of a mirror (3) disposed over a free-form optic (4). Then the light reflects off the back reflector (111) and is passed through the semi-reflective optic and through a shield layer (112) made of passive elements (8, 27, or 48) on its way toward the user's eyes (not shown).

The back reflector (111) can be arbitrarily engineered. In some embodiments the back reflector has a thin layer to impact the properties of the light. In some embodiments this layer can be a thin glass layer with a thin QWP lamination (10). In some embodiments, the back reflector (111) can be a flat or curved DOE (13). In some embodiments, the back reflector (111) can be a flat or curved metasurface with nanostructures. In some embodiments, the back reflector (111) can be a tunable freeform surface.

In some embodiments, the layer stack of switchable optical elements (37) can include reflective coatings, anti-reflective coatings (27), QWPs (10), HWPs (9), or partially absorptive layers. In some embodiments, the layer stack of switchable optical elements (37) is laminated or deposited on back reflector (111). In some embodiments, the layer stack of switchable optical elements (37) changes the directionality of the light in conjunction with a nano-imprint structure on the back reflector (111). In some embodiments, the layer stack of switchable optical elements (37) is switchable in polarization, reflectivity, or absorptive properties via an electric signal.

The shield layer (112) functionally mitigates the nonuniformity (waviness) observed in the virtual image and decreases the ambient light noise received by the user. Some part of the ambient light reflects directly from the shield layer, and some part of the ambient light enters the cavity and comes back. The shield layer (112) is a stack of layers laminated or deposited together such that the light that enters the cavity changes polarization and is absorbed by the stack of polymers. In some embodiments, the shield layer stack (112), depending on the polarization of the signal light or the image light) is tilted or bent to further decrease the ambient light and internal reflections of the cavity. In some embodiments, the shield layer stack (112) is composed of absorptive polarizers (8), QWPs (10), or arbitrary antireflection coatings (27). In some embodiments, the shield layer stack (112) has an absorptive substrate (28) to further decrease the ambient reflection because the ambient light passes twice through the shield layer stack. In some embodiments, the shield layer stack (112) has a liquid crystal layer (12,13) or optically tunable layer such that the electric signal applied (26) to the shield layer stack (112) can be leveraged to choose the image depth that needs to exit the cavity. In some embodiments, there is a liquid crystal layer with oscillating polarization on the shield layer to provide both polarizations to the outside world.

As an extension of this mechanism, switchable reflectors with higher order FECs provide tunable, multilevel depth modulation functionality. For every j levels (j=1:M) of switchable reflections that the LC stack layer can support, the resulting total number of optically modulated depth layers scales as a function of the order i, of the FEC (i=1:N): the number of optical depth layers is MN.

Notably, by using the configuration shown in FIG. 3A, the depth of the display system can be less than half the focal length of the display system at maximum magnification. The "depth" of the display device, in this context, is the distance between the frontmost point of the back reflector and the frontmost point of the aperture of entire display system.

Figure 3F:
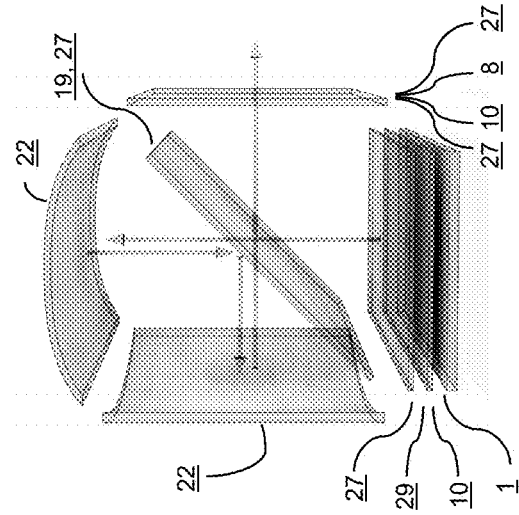
FIG. 3F is another view of the embodiment of FIG. 3B in which the multi-layered components are shown in "exploded" form.

The perspective views of the embodiment in FIGS. 3B and 3F illustrate a compressed cavity, which has a thinner footprint than that illustrated in FIG. 3A. Light is emitted from an emissive display (1), passes through pre-cavity optics (27,10, 29), is reflected by a narrow beam splitter (117) made of elements (19, 27) inside the cavity, is reflected by a 2D back reflector (116), and then passes through the beam splitter (117) and post-cavity optics and shield layer (118). Stray light is absorbed by an absorptive layer (28) at the bottom of the cavity. This compressed embodiment allows flattening of the effective curvature of the curved back reflector 116 and consequently flattens the virtual image spatial distribution. This is achieved by making the aperture taller in a thinner overall body, which effectively enables a larger focal length with the largest volumetric viewable zone compared to the "uncompressed" embodiment of FIG. 3A. In this embodiment, the beam splitter (117) has at least one segment that partially reflects the light to the reflector (116), and the rest of the parts interact with the light from the display (1) differently, such that the distance from the center height of the beam splitter (117) to the center height of the back reflector (116) can be less than one third of the height of the back reflector (116). In some embodiments, the beam splitter (117) is or has layered on it a micro-curtain layer (29) for extra freedom in the angular profiling of the light. In the embodiment of FIG. 3B the depth of the display system can be less than half the focal length of the display system at maximum magnification.

Figure 3G:
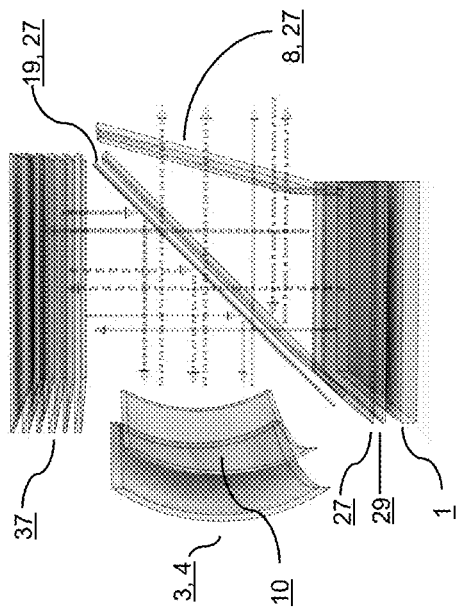
FIG. 3G is another view of the embodiment of FIG. 3C in which the multi-layered components are shown in "exploded" form.
Figure 3H:
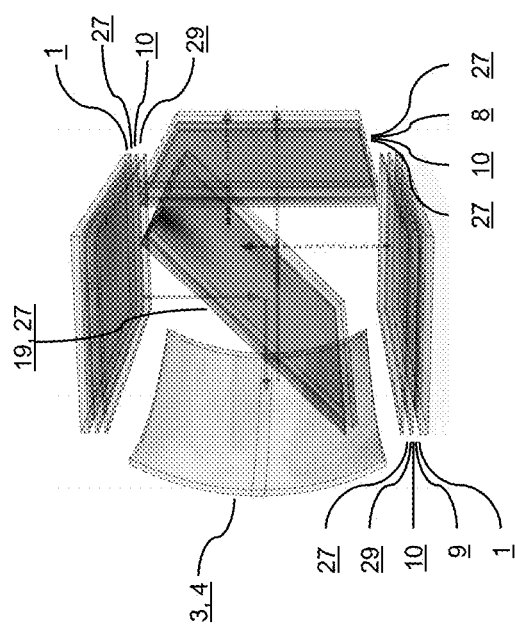
FIG. 3H is another view of the embodiment of FIG. 3D in which the multi-layered components are shown in "exploded" form.

FIGS. 3C and 3G each depict a perspective view of an embodiment that uses multiple seed (display) panels (1) to produce multiple depth layers. The beam splitter (120) can include switchable layers (12,13,16,17) to effect higher-order reflections within the cavity, and in some light paths, the light bundles can be directed directly toward the viewer or can be reflected by a curved back reflector (121) (e.g., a mirror (3) disposed on a free-form optic (4)). Light from the bottom seed panel (1) passes through pre-cavity optics (9,10,27,29) and is reflected by beam splitter 120 directly through post-cavity optics (27,10,8) and then thorough the shield layer (122) to the viewer. Light from the top seed panel (1) passes through pre-cavity optics (10,27,29) and is first reflected by beam splitter 120 toward the curved back reflector (121). The light is then reflected by the back reflector (121) and transmitted through the beam splitter (121) before passing through post-cavity optics (27,10,8) and shield layer (122) to the viewer.

FIG. 3D depicts a perspective view of an alternate FEC embodiment where 1D-1D bent optical surfaces (22) or DOEs, holographic optical elements (HOEs), metasurfaces, or Fresnel components (14) are introduced into the FEC design as an alternative way to control the evolving wavefront of the light in the cavity to provide wavefront control in perpendicular directions independently. This approach allows for lower complexity and wider manufacturing tolerances than with a single 2D optical component with the similar optical functionality and performance. A 1D-1D architecture such as this also provides a notable decrease in effective component weight, because thinner layers can be used.

In FIGS. 3D and 3G, light travels upward from the seed display panel (1) located at the bottom of the cavity, through pre-cavity optics (10,27,29) and through the beam splitter (126), after which it is reflected back downward by the first one-dimensional (1D) reflector (22) located at the top of the cavity. The light is then reflected back toward the second 1D reflector (22), which is located at the back of the cavity and oriented perpendicular to the first. The light is then directed through the beam splitter (126), post-cavity optics (27,10, 8,27) and shield layer (128) to the viewer. The combination of the two reflections from perpendicular 1D reflectors acts as a combination of two cylindrical lensing components that together provide the desired 2D convergence or divergence for the wavefront.

In some embodiments the 1D-1D curved reflector is such that the reflector is physically bent in one dimension and has a surface grating or DOE variation the perpendicular dimension to collectively act as a freeform 2D surface. The light then exits the display aperture, which is covered by a shield layer (8, 27 or 48) from the outside world. In some embodiments, although the back reflector is 2D, a layer stack (37) can be one dimensional, meaning it bends in one dimension. This is to allow the users head to submerge further into the aperture hence providing larger field of view.

In the embodiments of FIGS. 3A, 3B, 3C and 3D, the beam splitters (110, 117, 120, 126) may each have an antireflection layer (27) on the side from which light is to be transmitted through it. Also, in the embodiments of FIGS. 3A, 3B, 3C and 3D, the shield layers (112, 118, 122, 128) can each include an absorptive polarizer (8) coating and an antireflection layer (27).

Figure 4A:
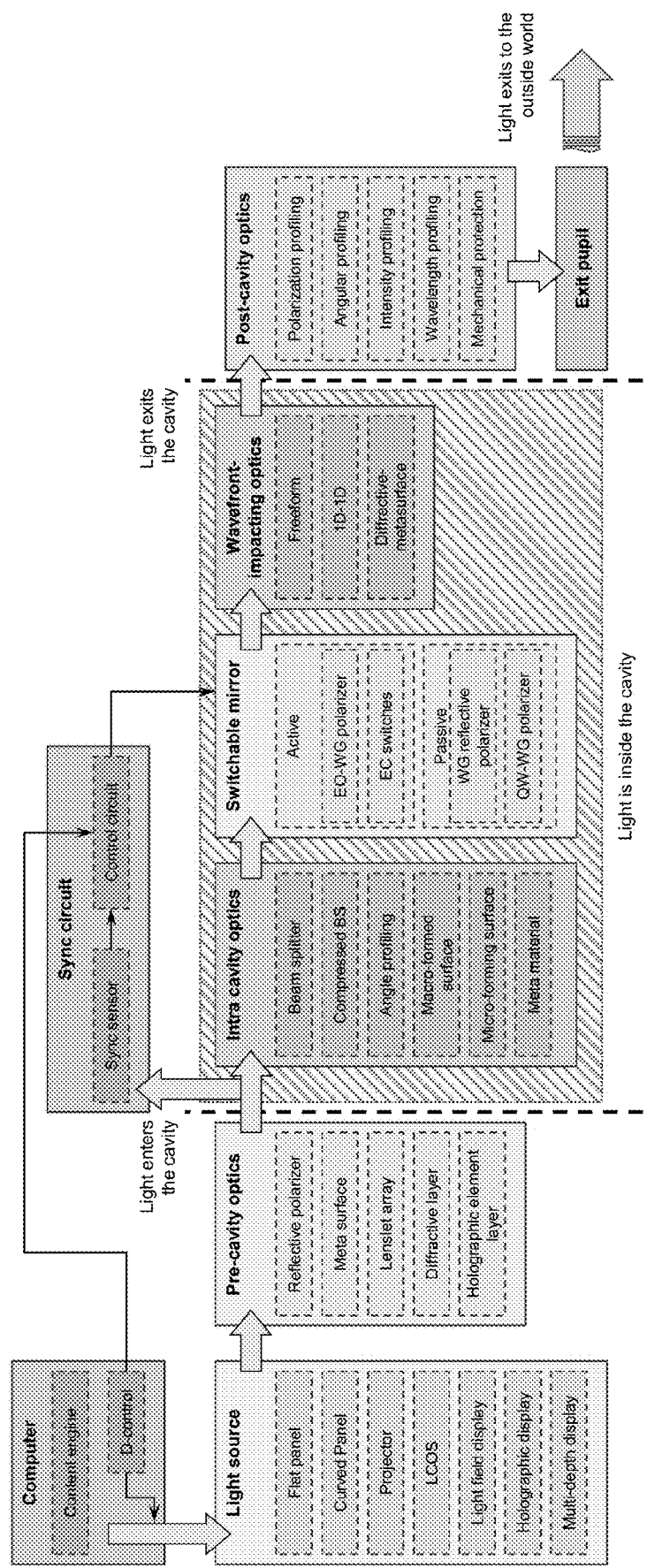
FIG. 4A illustrates block-diagram representations of a process that takes 2D or 3D content and produces a three-dimensional display.

FIG. 4A is a block diagram depicting common system processing building blocks that can be used to render either 2D or 3D content into the display system, in accordance with implementations of this disclosure. The display system is controlled by the computer and synchronization ("sync") circuit. Any pre-existing 2D or 3D content is processed by a computer (if necessary) and passed to the light source block. The processing might be to distort the image geometrically, or it might be to mask the image for multiple panels to appear as a larger image for the viewer after viewed through the optical system, or it might be to provide better field of view or fit all four corners of the image into viewer's field of view depending on viewer's location in front of the display. The processing might be to provide multiple layers of information at different depths. This subblock has a content engine, which executes the processing, and a depth control subblock, which signals the synchronization circuit. The sync block has two subblocks: one subblock is the sensor that can read an optical signal from the shown video stream on the emissive display, and the other subblock is the control circuit that commands the switchable mirror stack to control the optical path and consequently the depth of the shown image. The light source can be any one of a number of sources, or it can be a combination of multiple sources. As noted in the block diagram, it is an emissive display, so it can be based on any image creation technology, such as OLED, LCD, LCoS, etc., and it can be 2D, or autostereoscopic 3D, or any type of emissive display. Before being directed into the cavity, the light generated by the emissive display is impacted by pre-cavity optics to prepare the light for the rest of the system. In these pre-cavity optics, the polarization, directionality, intensity, color, or wavefront of the light might be impacted. When the light enters the cavity, it travels one or multiple round trips using intra-cavity optical components that are shaped geometrically and patterned with structure to impact the wavefront of the light. The light path can be modulated using switchable devices, and the wavefront shaped using arbitrarily engineered optical components. The light then exits the cavity where it is impacted for optimal viewing. The light passes through the exit pupil toward the user. Throughout the operation, the display system is synchronized with the computer that generates or plays the content. The typical examples of components for each block are given in the block diagram, and any arbitrary combination of these components might be used.

Figure 4B:
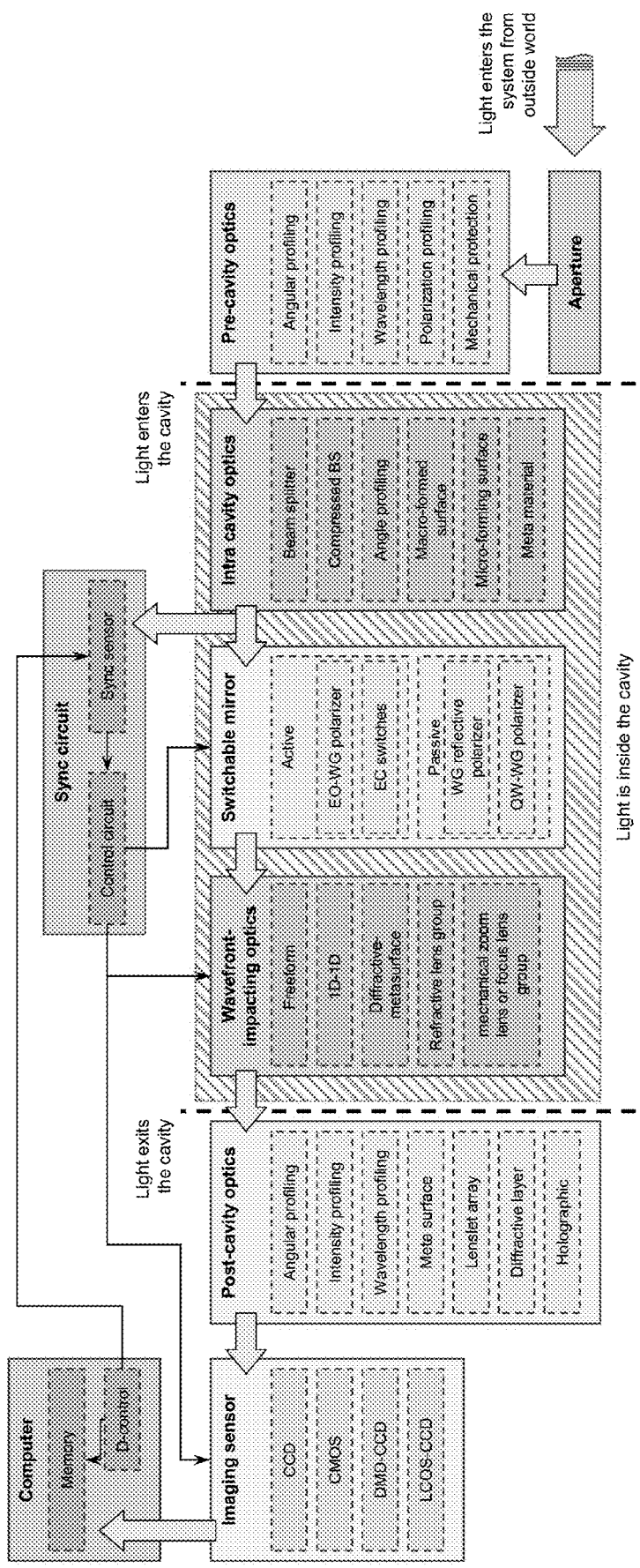
FIG. 4B illustrates block-diagram representations of a process that captures and records 3D images of scenes into a computer.
Figure 5A:
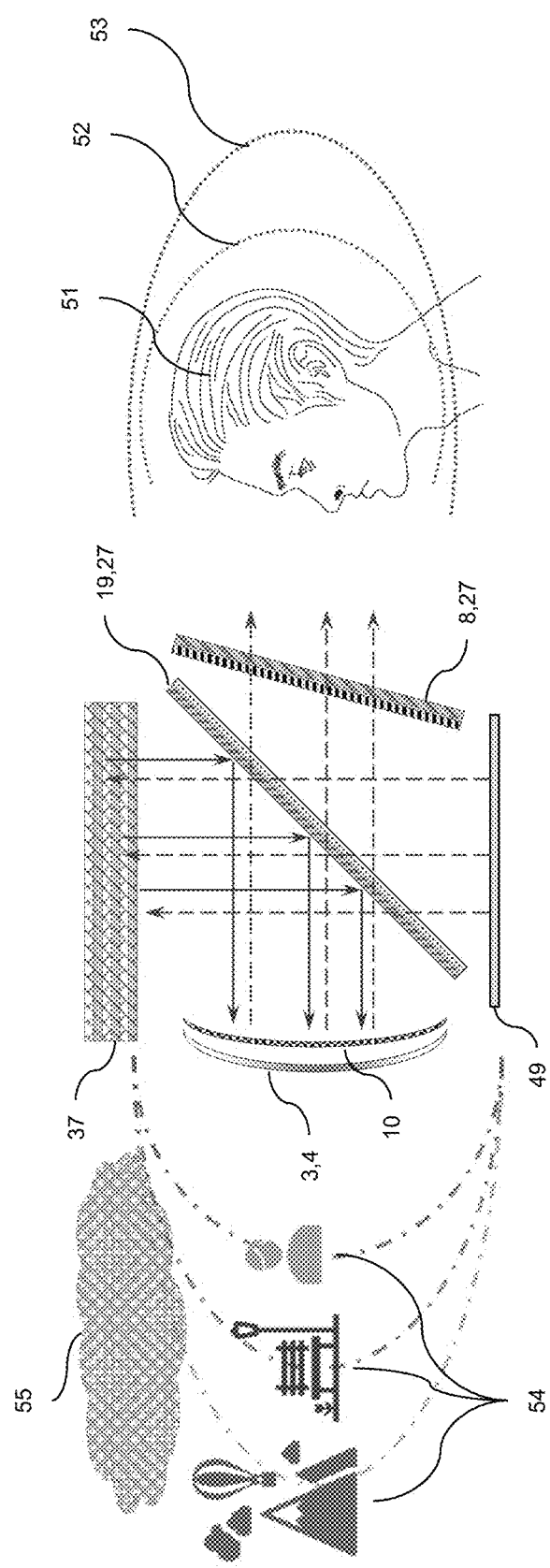

FIG. 4B is a block diagram depicting common system processing building blocks used to capture and record either 2D or 3D image content from an external scene, in accordance with implementations of this disclosure. Light enters the system through the aperture and is impacted before it enters the cavity. A combination of intra-cavity optics and switchable devices redirects the light along different paths within the cavity. The light then exits the cavity for post-cavity optical filtering, after which it is recorded by one or multiple sensors and digitized to be sent to computer memory. Here, the computer directly controls the sync circuit block to program or impact the light path inside the system. Different light paths can impact the optical zoom, focal plane, and lighting of the imaging system. The sync circuit for imaging systems (FIG. 4B) has two major subblocks: the sync sensor, which can be triggered by the outside signal coming to the camera or directly by the computer and, in turn, itself trigger control circuits; and the control circuit, which can impact switchable mirrors, wavefront-impacting optics, and imaging sensor settings. The typical examples of components for each block are given in the block diagram, and any arbitrary combination of these components might be used.

FIGS. 5A through 5K illustrate a set of embodiments, or an embodiment variation, for displays using switchable stacks, corresponding to the embodiment of FIGS. 3A and 3E. In the embodiment in FIG. 5A, light rays are emitted by an emissive display with arbitrary pre-cavity optics such as micro curtains, wave plates, AR coatings, etc. (hereinafter collectively referred to by reference numeral 49), through the beam splitter (19) with antireflection layer (27) to the switchable stack (37), after which it is reflected to the curved reflector (3,4), transmitted twice through a QWP (10) to shift polarization, and then travels through an absorptive polarizer (8) and antireflection layer (27) to the user (51) to increase the headbox size from (52) to (53). Here, the first reflection from the BS 17 goes directly toward the shield layer and is absorbed by the absorptive polarizer so it is not allowed for it to come out to the viewer. In some embodiments, a computer takes in 2D or 3D content (54, 55) and estimates the best-fit depth layers corresponding to that content through an optimization program that minimizes error. For example, some 3D content is provided with a game engine with the character in the front layer, the mid-ground in the middle layer, and the background environments in an optically deeper rear layer. The atmospheric particles (55) shown in the game or 3D environment are shown on all three layers to create a sense of depth for the user. This is done through depth thresholding, such that different cameras in the game engine or 3D environment engine render only a specific range of depths, matching the optical distances that are expected to be created by the display. In some embodiments, the processing software might convert 2D content—such as videos, or games, or pictures, or any 2D imagery or text—to multifocal views by using depth filtration techniques. In such techniques, the images first pass through an object segmentation algorithm. Then they pass through a depth estimation algorithm, and then different objects are tagged, or binned, to desired discrete depth layers. In some embodiments, different layers (54) might be fed by completely different sources of the content or even different computers. In some embodiments, the annotation on the front layer might be generated based on the content shown in the deeper layers such that the front layer is an augmented-reality-like experience for deeper layers. In these embodiments, the deeper layers are based on a master application run by the user's personal computer, while the front layers are generated as annotation layers via another application that reads the input on the first master application and suggests or recommends content depending on the master's application activities. In some embodiments, the computer shows content on different layers based on best depth estimation of 3D or 2D content and through an optimization program that fits the 3D curves layers to that depth profile with minimal error.

FIG. 5B, shows an example embodiment in this switchable stack family. Here, the display (1) can emit light that then passes through a continuous polarization rotator material (56). A polarization retarder continuously rotates the polarization angle of the light that passes through it. It is a variable polarization-control layer with desired increments in polarization angle. In some embodiments, this layer can be meshed or be a grid such that the polarization of each pixel or desired subset of pixels can be controlled. The light then passes through a beam splitter (19) and is reflected by a monolithic birefringent reflector (57) such that different polarizations experience different optical thicknesses and therefore travel different optical depths. The monolithic birefringent material can be a stack of two crossed polarizers (8) or polarization-dependent reflectors. The polarization modulation can vary across different pixels in one frame of the display, and it can be modulated for a given pixel over time. After reflection, it bounces off the beam splitter (19), then a curved reflector (3,4,10), and finally passes through post-cavity optics and shield layer (48) to the user. The emitted light can be of arbitrary polarization (58). Similarly, as shown in FIG. 5C, some embodiments can operate in transmission mode and can emit light from the display (1) through an electro-refractive or photorefractive layer (59), which can modulate the local or global refractive index using electrical or optical signals and then send the light through the beam splitter (19). The light experiences a round trip through a second electro-refractive layer (59) via reflection by a flat mirror (3). The beam splitter (19) redirects the light to a rear curved reflector (3,4,10), which then sends the light through post-cavity optics and shield layer (48) to the user. In some embodiments, the electrorefractive or photorefractive material (59) might be replaced with an FEC with a Faraday rotator designed such that the light travels a polarization-dependent number of round trips before it exits the cavity.

The embodiment shown in FIG. 5D is similar to those in FIG. 5B and FIG. 5C but has a switchable stack (37) or LC layer stack (12,13) composed of a mesh grid (60) or multiple mesh grids with the same or different periodicity (60), whose elements can be switched individually such that different pixels experience different depths. Grid layers can have identical resolutions or varying resolutions to produce different delay profiles. Light travels from the display and pre-cavity optics (49) through the beam splitter (19) to the grid (60), which reflects the light back to the beam splitter (19) to the curved reflector (3,4,10), and through the shield layer (48) to the user. Instead of reflector grids (FIG. 5D), some embodiments can emit light from a display (1) through a transmissive grid (61), shown in FIG. 5E, which may include an LC stack (12,13) to provide a parallax barrier and produce stereopsis such that the left eye and right eye see different pixels at different angles. The display can be any type of autostereoscopic display in this embodiment. Light travels through the grid and beam splitter (19), where it is reflected by a QM (31) to a curved reflector (3,4,10), and transmitted through the shield layer (48) to the user.

In the embodiment shown in FIG. 5F, after the display emits light through a lenslet array (43) or other angular profiling layer (11), the light is collimated, and it then propagates through a stack of switchable diffusive/transmissive grids (62). When a grid element is turned OFF, it is transparent. When a grid element is turned ON, it acts as a screen, and the light that strikes it produces a point source at that particular position. By varying the elements in the ON/OFF position, the point source depth of each pixel can be changed. The light then travels through the beam splitter (19), to a QM (31), to a curved reflector (3,4,10), and through the shield layer (48) to the user. The flat mirror here is to increase the display's optical path to the curved reflector so that a smaller curvature is required for the reflector; this allows the increase in the headbox region.

In FIG. 5G, light is emitted from the display (1), and an electrically-controlled liquid-crystal HWP (9) can rotate the polarization of the light. The light strikes a PBS (20). x-polarized of the light, when the HWP is ON, experiences a first-order reflection from the PBS (20) and passes directly through the shield layer (48) to the user. When the HWP is OFF, the light is converted into y-polarized light, travels through the PBS (20), is reflected by a QM (31), which rotates the polarization 90 degrees, into x-polarization. At this point the light cannot pass through the PBS (20) anymore, so it is reflected by it and then by the curved reflector with QWP, which rotates the polarization through another 90 degrees, back into y-polarization, and reflects it through the PBS (20) and then, finally, through the shield layer (48) to the user. This first- and second-order reflections corresponds to two different depth layers (54).

As shown in FIG. 5H, in the majority of embodiments, the curved mirror can be replaced by a half-reflective curved mirror or thin lens or thin lens group (19,4,10) that can be positioned closer to the user to increase the field of view and the headbox. In the figure, the dotted box (63) represents any display (1) or any FEC or other cavity arrangements, which contain multiple display elements (1), retroreflectors (18), LC layers, and beam splitters (19). The half-reflective curved surface can be combined with a PBS (20), absorptive layer (8), and antireflection layer (27) to act as a compound reflector. Here the top display and the back display have absorptive polarizers to absorb unwanted internal reflections of other displays; the light from back display passes through the PBS (20) through the front lens and exits the cavity. The top display emits light downward, where half of the light is transmitted through the PBS (20) and then is reflected from the surface of the bottom display with a perpendicular polarization. It then reflects back toward the semitransparent freeform optic and exits to the world. The light from the bottom display just goes up and is reflected by the PBS (20) toward the outside world. The bottom display creates length P1, the back display length P2, and the top display length P3, such that P1<P2<P3. After the freeform optics, the viewed images would appear at three different depths that are significantly differently from one another. In a majority of embodiments and sub-embodiments of FIG. 3, the reflector can be replaced by a segmented reflector to combine images from multiple displays while deleting or concealing the lines between the smaller displays resulting in an optically fused, larger continuous image with larger FoV (see U.S. Pat. No. 11,196,976, hereinafter "reference [5]," and U.S. Patent Application Publication No. 2022/0057647, hereinafter "reference [6]," both of which are incorporated herein by reference in their entirety)

FIG. 5I illustrates an embodiment in which multiple OLEDs or thin flexible displays (64) or curved displays (5,49,64) and/or the reflective mirror or QM (31) can be shifted mechanically with a vibrating coil or an arbitrarily engineered actuator or actuator arrays (15) to change depth locally or globally by varying the physical path that the light travels. In this embodiment, the PBS (20) can include antireflection layers (27). After the light bounces off the curved reflector (3,4,10) and through the beam splitter, it passes through another PBS (20) and antireflection layer (27) to the user to minimize stray reflections. In some embodiments, as shown in FIG. 5J, the multiple sets of displays and pre-cavity optics (49) can each have placed after them multiple switchable EORS stacks (37) with a semi-transparent curved mirror or thin lens or lens group (19,4,10) and PBS elements (20, 8, 27). Light from one display will travel through its associated stack and is reflected the other display's stack. Both paths will travel through the curved semi-transparent mirror, both sides of which include a QWP (10), and are fused together with a segmented or bent PBS (20) that act together as a compound reflector.

FIG. 5K depicts an embodiment with two orthogonal displays (1) each with switchable LCD layers (12,13) and semi-reflective surface coatings. When both LCs are OFF, the light from back display just passes through PBS and exits to the outside world, and the light from bottom display travels up, reflects from the PBS, strikes the surface of the back display that is semi-reflective, experiences polarization rotation due to the QWP on top of back display, passes through PBS, and then exits to outside world. When the LC on the back display is ON, the light hits the PBS, goes down and up, but it still cannot exit the PBS because there is no QWP on bottom display to rotate its polarization appropriately. The light then has to go back and hit the surface of the back display again where, because of QWP, it experiences 90-degree polarization rotation and now can pass through the PBS. These three light trajectories follow optical paths P1, P2, and P3, such that P1<P2<P3. The result to the viewer is three layers of depth. This embodiment does not have any lensing or curved optics, so it allows the viewer to see the depth with infinitely large headbox. This is appropriate for, but not limited to, in-vehicle or dashboard applications, which is discussed further below.

Figure 6A:
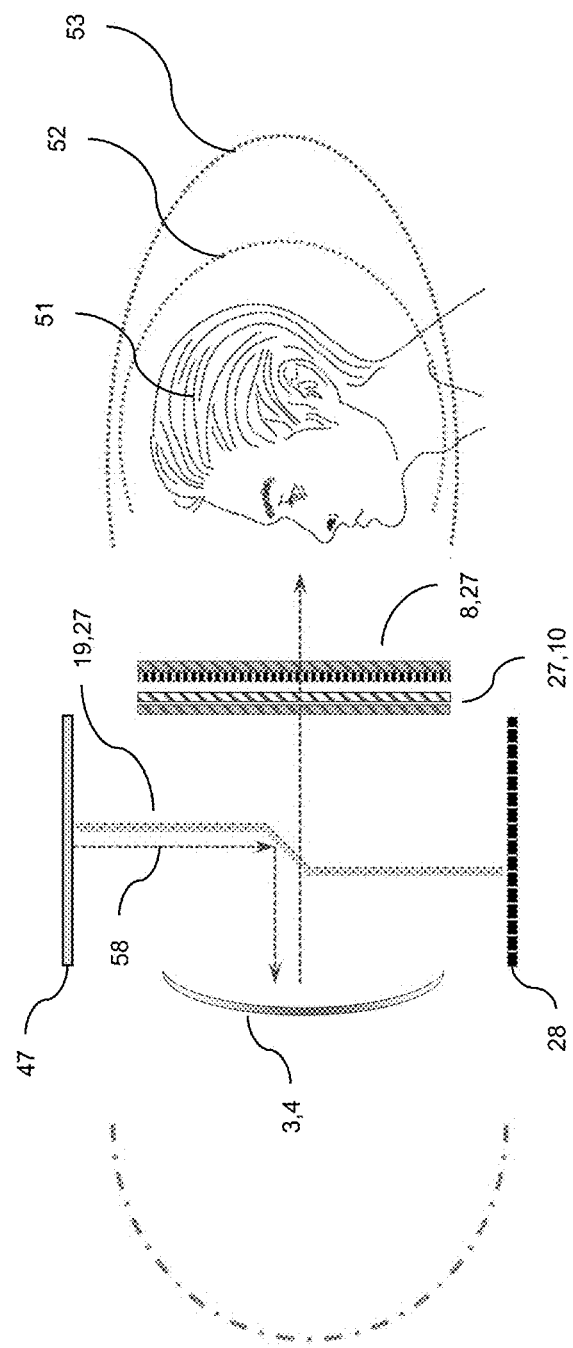

FIGS. 6A through 6K illustrate a set of embodiments for displays with a compressed cavity, corresponding to the embodiment of FIGS. 3B and 3F. Generally, surfaces can be macroformed such that their shape is arbitrarily engineered in one or two dimensions. The macroforming can be static or time-varying, such that mechanical waves travel across the surface and shape the surface spatially and temporally. The macroforming can be modulated in time with mechanical or with other actuators using ultrasound or acoustic waves, or it can be modulated electronically. As shown in FIG. 6A, a compressed cavity brings the curved reflector effectively closer to the user and increases the headbox from a small size (52) to a large size (53), and it increases the field of view compared to an extended cavity. The object distance (the optical distance from the display to the curved reflector), however, remains long. Light of arbitrary polarization (58) travels from a display or another cavity through pre-cavity optics (47), where it is reflected by a beam splitter and antireflection layer (19,27) to a curved reflector (freeform optic and mirror) (3,4) and passes through a layer stack, including an antireflection coating (27), and shield layer (48), to the user (51). FIG. 6B depicts another example embodiment with a double reflector forming a wedge-type structure. The light from the display (1) reaches the viewer, horizontally in the figure, only after multiple bounces, each of which increase the optical depth before striking the curved reflector with QWP (3,4,10), which serves to rotate the polarization 90 degrees so that it can pass through the tilted front reflector. The physical depth is shorter than the optical path length because the angle of the tilted reflector is less than 45 degrees relative to the vertical. Two baffles (48) act as shield layers and prevent the user from seeing the displays directly. The architecture is designed such that the light from the display comes down, strikes the PBS, but it is not initially allowed to pass to the outside world. Then the light travels toward the interior vertical, flat reflector and is bounced back toward the PBS; the PBS still is cross-polarized, and the light now travels toward the curved reflector. The vertical reflector at its center height is 100% transparent, so the light passes through it and hits the curved reflector with QWP, which makes the polarization parallel to pass angle of the PBS. This light now passes through the PBS and exits to the outside world. In some embodiments, the tilted layer might be a reflective surface that changes reflectivity with incident angle.

Instead of flat, static reflectors, the embodiment in FIG. 6C emits light from a display (1) and includes an anamorphic macroformed surface (65) that is excited by mechanical (e.g., ultrasonic or acoustic) waves at desired frequencies and amplitudes to produce reflection and transmission. The image is rastering in sync with the waves traveling on the reflector. The material can be made of polymer-based materials like PMMA, thin glass, and combinations of glass and polymer-based materials. The polymer-based material might have a semi-reflective coating or act as a substrate for a thinner layer of glass. The display is raster-scanned or has a shadow mask, and it is synchronized with the surface waves on the anamorphic layer to deflect light rays at specific positions along different distances. The image shown can be pre-distorted to compensate for distortions induced by the anamorphic surface at desired times. Light from the display (1) is x-polarized and is reflected by the anamorphic beam splitter. The curved reflector includes a QBQ layer to rotate the polarization into y-polarized light such that it can pass through the anamorphic beam splitter. Light from the display panel pixel t1 travels a distance p1, and likewise for pixel-distance pairs t2-p2 and t3-p3. These light rays strike the curved reflector (3,4,10) and pass through a shield layer (48) to the user. The shape of the reflector (65) is such that the effective angle it makes with the horizontal is greater than 45 degrees, but the positions where the waves strike are shallower so that they exit the cavity horizontally. The cavity's physical depth is compressed while maintaining a wide field of view, as illustrated by the wider separation between the light rays across the shield layer (48) compared to their separation at the display panel (1).

In some embodiments, the synchronization between the light emitted from the display panel and the motion of the anamorphic surface can redirect individual pixels, t1, t2, and t3, to travel different lengths or to different positions relative to the user's eyes to create stereopsis or to adjust the monocular depth. In some embodiments, angular profiling layers can help redirect these light rays. The timing of the display and anamorphic reflector is controlled in such a way that the curved reflector sees a vertical reflection of the display that can be taller or shorter than the physical height of the display. This effect can be achieved both with changing the timing or with increasing the amplitude and frequency of the macroforming waves on the surface of the anamorphic reflector.

Similarly, the embodiment in FIG. 6D generalizes that in FIG. 6C and includes multiple anamorphic surfaces (65) that act together as a waveguide or image guide. The surfaces are modulated with mechanical waves such that the surfaces shapes are complimentary. Two tilted displays (1) couple light into the waveguide at such an angle that the light that exits the waveguide toward the curved reflector has horizontal chief rays after two or multiple reflections with compensating steep and shallow angles. In some embodiments, these waveguides are polarization-dependent and include shield layers and reflective coatings (66) at different regions of the waveguide to increase the efficiency. The top and bottom portions of the surfaces can be fully reflective to increase efficiency. The light can be of arbitrary polarization (58).

The embodiment in FIG. 6E includes tessellating structures known as orthogonal field evolving cavities (OFEC) (see reference [5]). A display (1) emits light, which immediately passes through a lenslet or lenticular lenslet or pinhole array (67), or other angular profiling element (11), which tilts light from different pixels into different, specified directions. Vertical mirrors (3) guide the different rays to a beam splitter (19,27), which redirects different cones of light to different parts of the rear curved reflector (3,4,10). The light rays then travel through the beam splitter (19, 27) and shield layer (48) to the user, who views different cone bundles coming from different heights. One cone of rays produces image I1, a second cone 12, and a third cone 13. Each of these sub-images is fused together to create, or vertically tile or tesselate, a wider vertical field of view. Here, the images of each subset of pixels represent a certain tile or segment of the total image, so the seed image should be interlaced with different segments that are shown on the higher-resolution, narrow panel at the core of OFEC (see reference [5]). In some embodiments, the OFEC may have switchable, polarization-based mirrors that are time-synchronized. Examples of the OFEC and how to program it are described in reference [5].

In FIG. 6F, a single anamorphic reflector can be used with large-amplitude surface modulation. It is fully reflective at the edges (68) to guide the display light efficiently to a semi-reflective region (69). The light then reflects from a curved reflector (3,4,10) to the user. The vertical orientation of the displays increases the compression of the cavity. The curved reflector can include a QWP layer to rotate the polarization 90 degrees for polarization-dependent reflections. Instead of a modulated anamorphic reflector, the example embodiment in FIG. 6G uses a curved PBS (70) before the curved reflector (3,4,10) so as to bring the curved reflector effectively closer to the user and increase the field of view. The beam splitter (19) can be curved in either one or two dimensions, but the impact that this curvature has on the light should be compensated for or considered in the design of the complementary back reflector and seed image, such that the net effect is the desired virtual image. Thus, the image on the display is pre-distorted so as to computationally compensate for any distortions induced by the beam splitter. The back reflector also exhibits vertical freeforming (4) to optically compensate for the beam splitter's shape. The light emitted by the display is x-polarized and is reflected by the curved PBS. The curved back reflector includes a QWP layer to rotate the polarization 90 degrees such that it can pass through the PBS to the user.

As shown in FIG. 6H, the emissive display of the majority of these embodiments can itself be replaced by an arbitrarily engineered FEC (71) with multiple displays to generate a plurality of depth layers or to increase brightness. The dotted box can represent any such cavity. Vertical displays do not reduce the compression of the embodiment, and the embodiment functions in the same way as others. x-polarized light is emitted by the FEC (71), is reflected by the PBS (20), then reflected by the curved back reflector (3,4), which has a QWP (10) to rotate the polarization. The light is now y-polarized, and travels through the PBS (20) and shield layer (48).

Some embodiments, such as that shown in FIG. 6I, use rotating one-dimensional mirrors (72) to create two-dimensional lensing with a tunable or rastering focal length. In FIG. 6I, an emissive display (1) or a projector emits x-polarized light, which is reflected by a PBS (20) through a QWP to produce circularly polarized light. The light is reflected by a one-dimensional rotating mirror (72) back through the QWP (10), which results in y-polarized light that can now pass through the PBS (20). The light then passes through another QWP (10) again producing circularly polarized light, which is then reflected by a second one-dimensional rotating mirror (72), oriented perpendicular to the first. The reflected light again passes through the QWP (10) and is converted into x-polarized light that is finally reflected by the PBS (20) to the user. Such embodiments are most suited for micro projection or a component for headset-based systems.

FIG. 6J illustrates an embodiment in which x-polarized light that travels upward from the emissive display with pre-cavity optics (49) through a PBS (20) steeply tilted at an angle greater than 45 degrees. The light then strikes a titled QM (31), which reflects y-polarized light at a titled angle. The light is reflected by the PBS (20), then reflected by the curved reflector (3,4) and QWP (10), which rotates the polarized back into the x-polarized orientation. The light is transmitted through the PBS (20) and through the shield layer (48). In some embodiments, the emissive display at the bottom might have an OFEC to tesselate larger vertical fields of view. In some embodiments, the mirror at the top might be a 1D or 2D convex mirror to adjust the optical distance and engineer the desired vertical field of view.

FIG. 6K depicts a display in which pre-cavity optics (47) emit x-polarized light. The light travels upward through a tilted beam splitter (19,27) and is reflected by an EO reflector (33), which can be tilted at different angles, or a stack of EO reflectors with different angles that turn reflective and transparent at different times. The net result produces light rays that are reflected at different angles at different time intervals. This embodiment therefore can raster, from a narrow display, a larger vertical reflection for the curved back reflector. All the light rays are reflected by the curved back reflector (3,4,10) and then propagate through the beam splitter (19,27) and shield layer (48). In the figure, the most steeply tilted position of the EO reflector (33) results in light path t3. The moderately steep position results in light path t2. The shallowest position results in light path t1. The combination of the titled EO reflector (33) and steeply tilted beam splitter (19,27) allow for a thinner overall footprint while maintaining a larger vertical field of view.

Figure 7A:
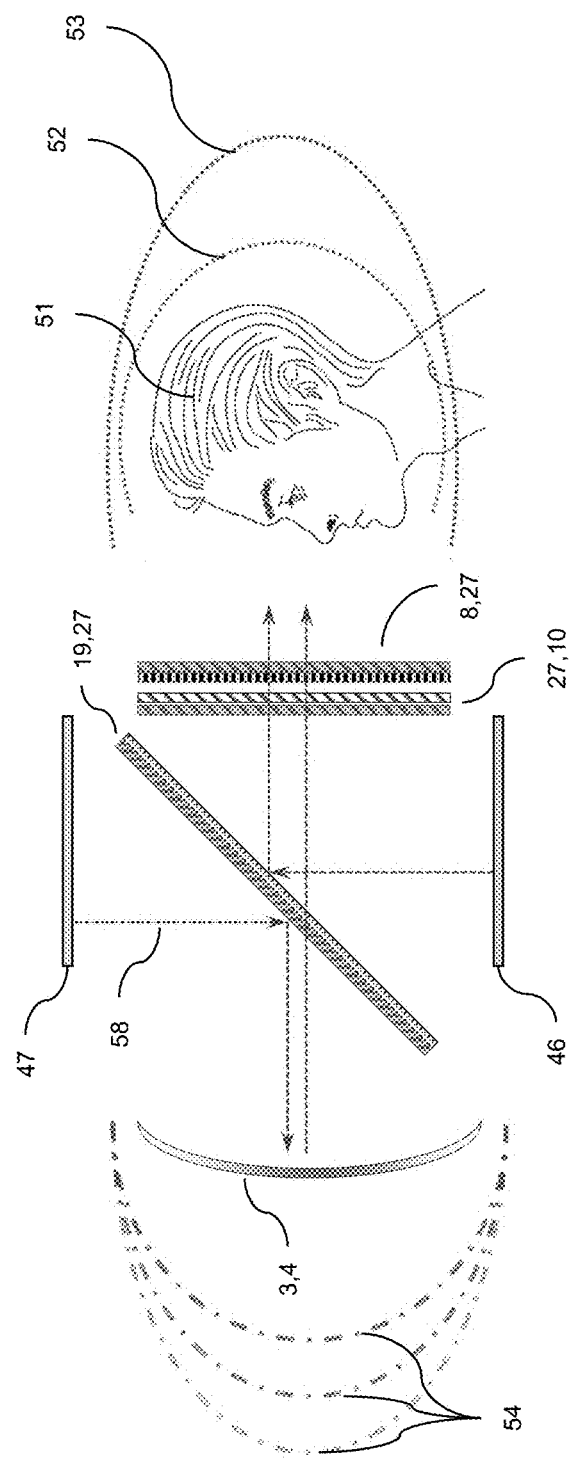

FIGS. 7A through 7F illustrate a set of embodiments for multi-focal and fractional lightfield displays with multiple seed display panels, corresponding to the embodiment of FIGS. 3C and 3G. In FIG. 7A, light with arbitrary polarization (58) travels both up and down from emissive displays with pre-cavity optics (46,47). Light from the bottom display layer is reflected by a beam splitter and anti-reflection coating (19,27) to the user, and light from the top display is first reflected to the back curved reflector (3,4) and then exits to the outside world. Both sets of light bundles travel through a stack of layers (27,10,8,27) before reaching the user (51). The result is multiple depth layers (54) seen by the user. In some embodiments, the lower display can be covered with absorptive micro-curtain to block direct line of sight light.

FIG. 7B shows a similar embodiment that replaces the center beam splitter with a PBS (20) sandwiched between switchable LCD layers (12,13) that themselves switch between two modes. Two displays (1) can generate four layers of depth in total. When the LCD layers are ON (12), they leave unchanged the x-polarized light is emitted from both of the displays (1). The light passes through a QBQ (30) stack laminated on top of the display; the light rays are then reflected by the PBS (20). Light from the top display is then reflected by the back reflector (3,4), and the QWP (10), which results in y-polarized light that travels through the PBS (20) to the user and corresponds to a distance P1. The light from the bottom display is reflected directly to the user and corresponds to a distance P2.

When the LCD layers are OFF (13), the x-polarized light from top display (1) again passes through a QBQ (30) and is rotated by the top LCD layer (13) into y-polarized light. It passes through the PBS (20) and through the bottom LCD layer (13), such that it leaves as x-polarized light again. It strikes the QBQ (30) laminated on the bottom display, which rotates the polarization into y-polarization and reflects it back up; the light is now reflected by the PBS (20) to the user and corresponds to a distance P3. When the LCD layers are OFF (13), the x-polarized light from bottom display (1) and QBQ (30) travel through the LCD-PBS-LCD layer (13,20, 13), is reflected by the QBQ (30) laminated to the top display, which rotates the polarization and reflects the light back down. The light is then reflected by the LCD-PBS-LCD layer (13,20,13) to the curved reflector and QWP (3,4,10), which rotates the polarization again, such that it passes through the LCD-PBS-LCD layer (13,20,13); it exits the cavity and corresponds to a distance P4. In total, four possible depths are produced.

Similarly, the embodiment in FIG. 7C uses a liquid-crystal layer and beam splitter in a different orientation relative to the display and mirrors to produce different depth layers. When the LCD is ON (12), x-polarized light is reflected by the PBS (20) to the curved reflector with QWP (3,4,10), rotated into y-polarization, and travels back through the PBS (20) and through the shield layer (48). When the LCD is OFF (13), y-polarized light travels through the PBS initially. There is a QM (31) reflector at the bottom which transforms the light into x-polarized light, which is then reflected by the PBS (20). These two optical paths results in two depth layers seen by the user.

In FIG. 7D, the curved reflector (3,4) is half reflective. In this embodiment, all the displayed depths are curved and have large distances. The light from all of the display panels (1) on the top, bottom, and back (or left) of the cavity interact with it and therefore create longer distance virtual images. The top display has a reflective layer to increase the optical path. Light rays from the left and bottom display panels are reflected by this layer before striking the curved reflector. Micro curtains on the top and bottom displays will prevent unwanted light from entering the user's eye. Three representative light paths indicate relative distances. y-polarized light (P1) from the left display panel (1) travels directly through the curved reflector (3,4), is reflected by PBS (20) upward, and then is reflected by the semi-reflector on the top display. It then travels down to the PBS and because it is still cross-polarized, its travels back to the curved QBQ at the back, which changes the polarization and directs it through the PBS and to the outside world. x-polarized light (P2) from the top panel is first reflected by the PBS (20) and then reflected by the curved QBQ layer to rotate the polarization 90 degrees into y-polarization, which then passes through the PBS (20) and shield layer (48). y-polarized light (P3) from the bottom display panel (1) first passes through the PBS (20), then is reflects from the coating on the top display panel, and then traces the path of P2. In this example embodiment, the distances are ordered such that P1<P2<P3, and the result is three layers of depth for the user.

The embodiment in FIG. 7E includes, in addition to a seed display panel (1), a projector or projector array display (74). The projected light is y-polarized and strikes a polarization-dependent diffuser (73), which then acts like a transparent display layer. The diffuser layer can be monolithic or a grid with individual switchable grid elements. The light is reflected by the beam splitter (19), to the curved reflector (3,4), and through a shield layer (48). Light from the flat display panel (1) is reflected by the beam splitter and then by the curved reflector (3,4,10), which rotates the light into y-polarization for transmission through the beam splitter. The projector array at the bottom can be synchronized with the image projected from the top display computationally such that autostereopsis is provided, or such that it creates higher dynamic range in the image, or such that it provides a fractional lightfield such that luminosity effects such as sparkle or shimmer in the scene can be represented or amplified, or such that different images are seen from different angles.

The embodiment in FIG. 7F is an example of an X-shaped architecture with multiple seed displays (1) and LC layers (12,13). Light from the top layer is polarized perpendicular to that of the bottom layer. The two PBS (20) layers are oriented such that they reflect and transmit opposite polarizations. In the ON mode, light travels from each display (1) through the closer PBS layer (20). Each is reflected by the curved QM reflector at the back, which rotates the polarization such that the reflected light passes through the related PBS (20) layer and then through the shield layer (48). In the OFF mode, the polarization of the light from the displays (1) are first rotated by 90 degrees and are simply reflected by the first PBS reflectors (20) through the shield layer (48). In some embodiments, optical fusion mechanisms such as invisible bends and computational masking might be used to fuse the images from different segments with no bezel line or seams in the middle (see reference [6]).

Figure 8A:
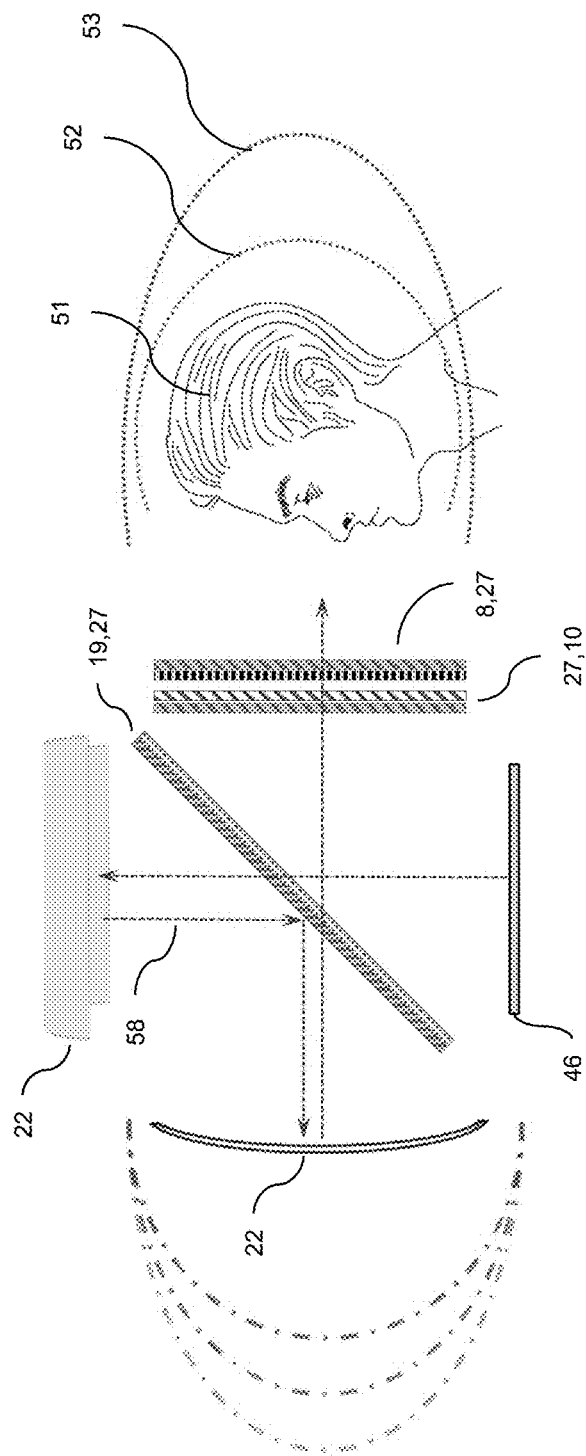
FIGS. 8A through 8P illustrate a set of side views of example embodiments using various 1D-1D architectures, generalized from FIG. 3D, and include both static and mechanically modulated layers.
Figure 8O:
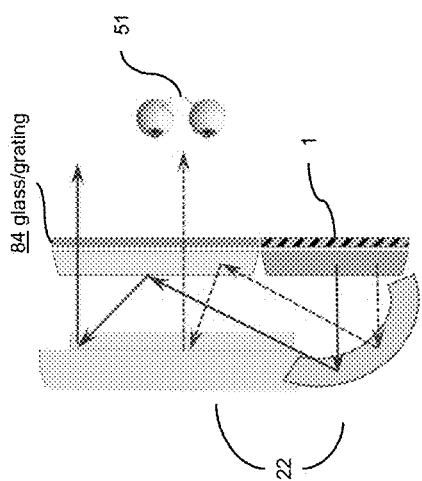
Figure 8N:
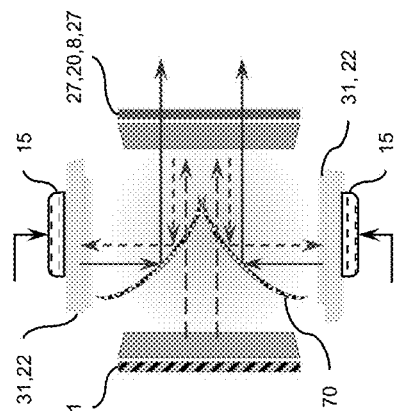
Figure 8M:
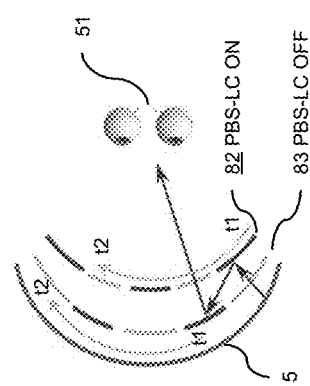
Figure 8L:
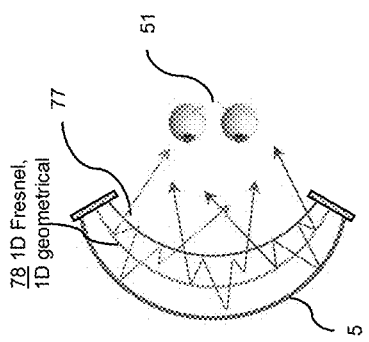
Figure 8P:
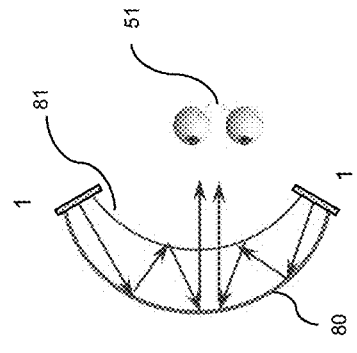

FIGS. 8A through 8P illustrate a set of embodiments for displays with multiple one-dimensional elements to mimic two-dimensional lensing or impact the light (the 1D-1D architecture), corresponding to the embodiment of FIG. 3D. The elements can be macroformed in one dimension and uniform in another dimension. They can also be created in a hybrid 1D-1D manner, in which the element is macro-formed in one dimension and possesses structure variation in the other direction. This structure can include a 1D meta-surface layer or a diffractive grating or a Fresnel-lens-like structure. For example, the embodiment in FIG. 8A includes two one-dimensional geometrically curved surfaces with curvatures in perpendicular orientations. The result embodiment focuses in two dimensions and approximates a 2D curved surface. Light of arbitrary polarization (58) travels up through some pre-cavity optics (46), through the beam splitter layer (19,27), and then to the first 1D bend (22). It is then reflected by the beam splitter layer (19,27) toward the second 1D bend (22), which is oriented perpendicular to the first. The light then travels through the beam splitter layer (19,27), through post-cavity optics layers (27,10,8,27), and finally to the user (51). The design can increase headbox from (52) to (53) because it increases the object distance while lowering the curvature of the curved optics. Similarly, the embodiment in FIG. 8B includes 1D curved displays (5), curved mirrors (22), and curved beam splitters (22). The geometries can be adjusted relative to absorber (28) and shield/post-cavity layers (48). Light of arbitrary polarization (58) is emitted from a curved emissive display (5) (which can be OLED or POLED in some embodiments), reflected by a 1D curved beam splitter (22), reflected by a 1D curved reflector (22), and then transmitted through post-cavity optics (48). An absorptive layer (28) removes the stray light.

In the embodiment in FIG. 8C, a curved display (5) emits light of arbitrary polarization (58), which is reflected by a curved beam splitter (70) to a 1D curved reflector, oriented perpendicular to the curvature of the display. The light rebounds through the curved beam splitter (70) and through the shield layer (48). The curvatures are designed such that together they emulate a single 2D curved reflector.

As shown in FIG. 8D, light can be emitted from a display (1) through a polarizing 1D curved beam splitter (70) and through a 1D curved half-reflector (22), all in a coaxial manner. Polarizing layers change the polarization of the light as it makes round trips through the cavity. Circularly polarized light is emitted by the display (1), converted into y-polarized light by a QWP layer on the curved half reflector (70), reflected by the second curved reflector (22), oriented perpendicular to the half-reflector. After a second reflection by the half-reflector, the light is rotated into x-polarized light, which allows it to be transmitted through the 1D curved PBS reflector (22) toward the outside world.

In the embodiment in FIG. 8E, the one-dimensional layer can be curved, i.e., possess geometric structure, in one direction and have surface structure in the perpendicular direction (75). This structure can be a lensing or diffractive structure and can include, for example, a DOE (14) or a Fresnel grating or a metasurface. In this embodiment, light is emitted from two display panels (1), which have reflective coatings, and travels to the 1D-1D hybrid structure (75) through the post-cavity optics (48). Similarly, as shown in FIG. 8F, 1D-1D structures can both be Fresnel diffractive structures. Light travels from the display panel (1), to two 1D surfaces (76), each oriented perpendicular to the other, and through the post-cavity optics (48).

The embodiment in FIG. 8G, includes a curved display (5) and QWP with a two-dimensional curved mirror (4) to guide round trips for the light. This embodiment can also have an extra freeform layer (77), which can be a Fresnel or diffractive layer, or it can be a metasurface. This latter freeform layer compensates the geometric curvature of the layer such that the net result is effectively an optically flat surface. For example, the concave 2D PBS layer that is facing the user has a metasurface or diffractive optic on top of it that has an optical power opposite the convexity, making it optically natural or flat upon reflection or transmission. This allows further thinning of the system, bringing the user's face increasingly closer to the curvature, and producing a larger field of view. The emitted light is circularly polarized, converted into y-polarized light by the center element (4), reflected by the freeform surface or metasurface (77), converted into x-polarized light upon a second reflection (4), and passed through the freeform surface or metasurface (77) to the user.

FIG. 8H illustrates an embodiment with a flexible emissive display (5). The display can be an OLED or POLED display or any flexible emissive display, and this display surface is modulated with mechanical waves of varying frequencies and amplitudes. The 1D curved display sends light through a hybrid 1D-1D structure (78) through a PBS (20).

In some embodiments, the 1D-1D structures are anamorphic and can be modulated with mechanical vibrations with varying frequencies and amplitudes. They can be modulated in the same way as, and therefore be synchronized with, the display modulation. The modulations will adjust the physical depth of the display and directionality of the light across the image. For example, the embodiment in FIG. 8I uses two anamorphic 1D surfaces, oriented perpendicular to each other, and modulated with surface waves (79). They reflect light from a curved reflector with QWP (3,4,10), which changes the polarization and allows for transmission through the post-cavity optics (48). x-polarized is reflected by the anamorphic layers, converted into y-polarized light upon reflection by a curved reflector (3,4,10), and propagates through the anamorphic layer and shield layer (48).

Similarly, in FIG. 8J, light of arbitrary polarization (58) travels through a flat beam splitter (19), reflects from two 1D-1D anamorphic surfaces modulated with surface waves (79) in perpendicular orientations, and then propagates through post-cavity optics (48) to the user. This embodiment generates a desired autostereoscopic and monocular depth profile. In some embodiments, this profile may change based on an input from a head tracking or eye tracking device.

In the embodiment in FIG. 8K, the display (1) and anamorphic surfaces (80, 81) can be arranged in a coaxial configuration in transmission mode with polarization-dependent coatings or surfaces. The display can include a moving shadow mask, synchronized to the anamorphic surfaces, to remove unwanted stray light and undesired artifacts. Circularly polarized light passes through the first anamorphic layer; the second layer reflects the light and converts it with a QWP layer into y-polarized light, which is reflected again by the first anamorphic layer. It is finally converted into x-polarized light and exits the cavity.

In the embodiment in FIG. 8L, the display is curved (5) in only one dimension and emits light through a hybrid 1D-1D element (78). This element is geometrically curved in the same direction as the display, but in the perpendicular direction it has a Fresnel grating or metasurface or diffractive optical structure such that the composition appears as a 2D surface to the display light that is reflected back from the front PBS layer. The outer PBS layer also possesses a freeform metasurface or diffractive element (77). The compound structure is designed to mimic a flattened surface without sacrificing field of view, similar to the embodiment in FIG. 8G. The light travels back to the hybrid 1D-1D structure and is transmitted to the outside world. The net result is an extremely thin virtual display (thinner than FIG. 8G) or fractional light field display or a multi-focal display that curves in front of the user and has only 1D geometrical curvature. In some embodiments, the display might be covered by a flexible LC layer to switch the polarization of the light and consequently create multiple layers of depth.

Instead of waveguiding along the structure, some embodiments, such as that illustrated in FIG. 8M, can include a curved display (5) with segmented one-dimensional curved surfaces. The segments are raster-scanned (turned reflective, absorptive, and transmissive) sequentially to guide light in a non-coaxial manner. LC layers with PBS elements can turn gates/segments ON (fully reflective) and OFF (fully transparent) or absorptive to manage the unwanted reflections or light leakage (82,83). Light is guided along preferred paths to increase optical throughput efficiency. A pixel can experience one round trip (t1) or multiple round trips (t2) before is exits the cavity. In some embodiments, these layers can be one-dimensional Fresnel structures and perpendicular geometric half reflectors (hybrid 1D-1D half reflector).

FIG. 8N illustrates an embodiment in which two 1D-1D pairs are oriented such that light is reflected by them twice. The display panel emits light (1), which is y-polarized, through the polarized curved half reflectors (70). This is done in two segments, top segment and bottom segment. In some embodiments, more segments might be used. The light bounces back from the shield layer with rotated polarization after reflection from the post-cavity optics (27,20,8,27). Then it reflects vertically to 1D curved reflectors (22), which have perpendicular orientations. They change the polarization (31) and then reflect the light back down to the curved half reflectors (70). The light is reflected through the post-cavity optics (27,20,8,27) to the outside world. The top and bottom 1D reflectors can be macroformed or moved by an actuator to control the depth. Polarization optics allows for the light to become x-polarized and reflected by the curved beam splitters and through the post-cavity optics. The double reflection from the curved half-reflectors in the middle allow for a smaller curvature of those reflectors and consequently increased headbox.

In the embodiment in FIG. 8O, the display (1) is vertical and emits light of arbitrary polarization (58) to the left, where it is reflected by a one-dimensional mirror (22) into a light pipe, one side of which is curved (22) in an orientation perpendicular to the first mirror. The curvature of the first mirror is adjusted to compensate for the varying distances traveled by light emitted from different parts of the display. The light then travels through a piece of glass or a prismatic grating (84) or a film with angle dependent reflectivity to the user (51).

Finally, the embodiment in FIG. 8P depicts two displays that guide the light rays between two curved surfaces. The curved surfaces can be x- and y-microformed surfaces (80, 81), or they can be macroformed surfaces, or they can be segmented, or they can be a combination of these elements such that the light exits the center region and travels to the user (51) after two or multiple reflections between the back surface (on the left) and front surface (on the right, closer to the user's face).

Figure 9B:
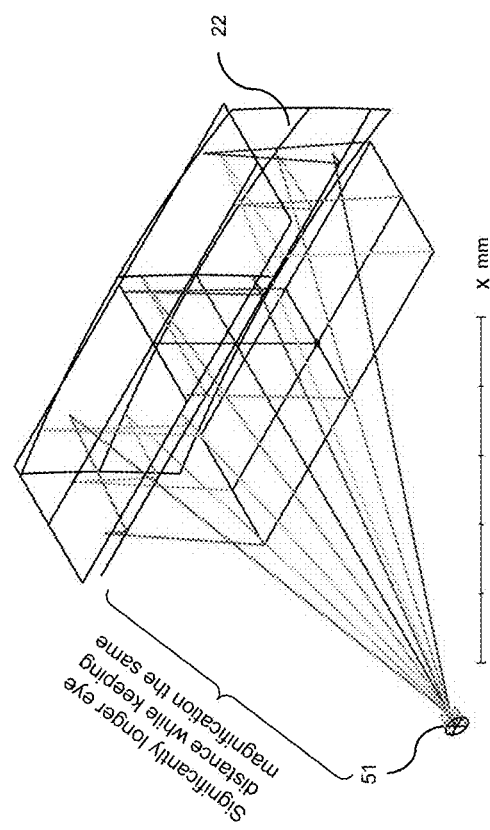
FIGS. 9A and 9B illustrate two simulated ray diagrams that demonstrate an increased headbox space and longer eye distance for a display system with multiple light reflections within a cavity compared to those for a display with a single reflection.
Figure 9A:
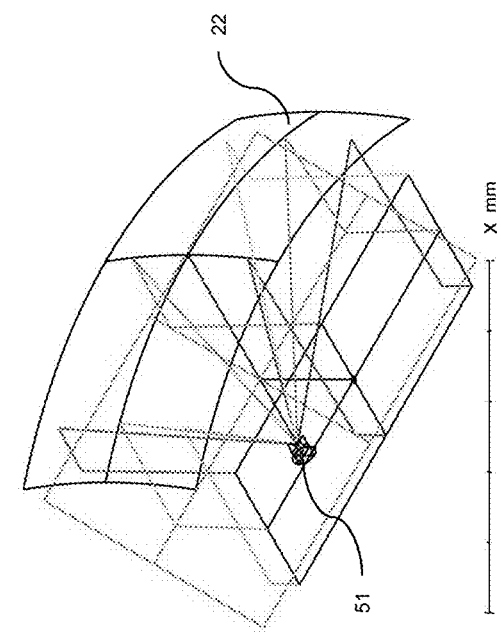

The embodiments in FIGS. 5A through 5K increase headbox space by having the light be doubly reflected within the cavity to fold the object distance on itself. FIG. 9A demonstrates a tight headbox as the light is reflected by one curved reflector. The eye distance is very short, and the user must remain fixed in a small region of space in front of the display system. In contrast, in FIG. 9B, multiple reflections by the display systems in FIGS. 3A through 3D with curved reflectors extend the eye distance significantly (e.g., to about 50 cm) while keeping the same magnification factor as in FIG. 9A. The headbox space is longer for more relaxed viewing experiences.

Figure 10B:
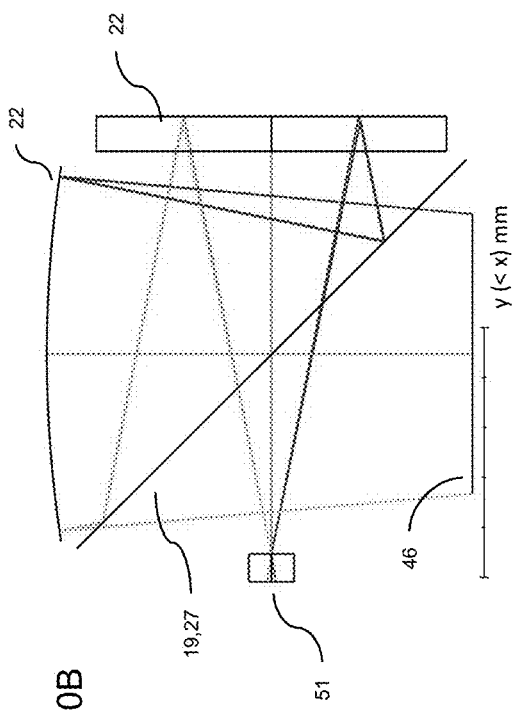
FIGS. 10A and 10B illustrate simulated ray diagrams for 1D-1D cavities.
Figure 10A:
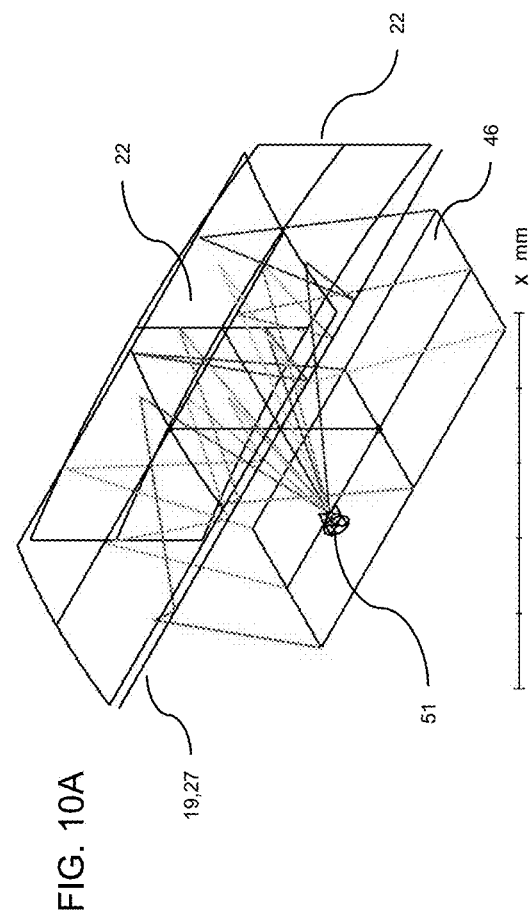

Further analysis is shown in FIGS. 10A and 10B. FIG. 10A and FIG. 10B are, respectively, perspective and side views of ray diagrams for 1D-1D cavities. Light is emitted from a display and pre-cavity optics (46) through a beam splitter layer (19,27), and 1D bends (22) are located on the top and back of the display system. The point spread function of an example 1D-1D cavity is approximately symmetric within the viewable zone with minimal aberration for the user.

FIGS. 11A through 11C illustrate schematically the manufacturing of some subsampled Fresnel lens diffractive structures. FIG. 11A is a schematic view of such an element in single-pass transmission mode. FIG. 11B adds a reflective layer to the substrate in refractive mode, such that the light passes through the structure twice. FIG. 11C illustrates a reflective coating on top of the diffractive structure. Such diffractive 1D structures can be implemented with a continuous phase profile or a subsampled one.

Additional embodiments are shown in FIGS. 12A through 12D. The techniques introduced above here can be implemented in portable applications, including headsets, displays in automated cars, and handheld devices. In headset devices, the display (1) emits light rays that are reflected by the cavity's beams splitter surface (19,27), and then by a single monolithic 2D bend (22). The light travels through the post-cavity optics and shield layer (10,8,27) to the user. Here, unlike in other headsets, the field of view of the left eye overlaps with that of the right eye, and the views are separated from each eye via polarization. This allows much better picture accuracy and reduces the nose blockage area present for headsets with two separate eye channels that come from separate displays. In an alternate embodiment, the display emits light, which is reflected by the beam splitter surface (19,27), then by a mirror and freeform optics (3,4), and then directed through post-cavity optics and shield layer (10,8,27) to the user. An absorptive layer (28) removes stray light. Similarly, the display can emit light, which first propagates through some pre-cavity optics (27,10,29), and is then reflected by the beam splitter layer (19,27), then a 1D bend (22), then through post-cavity optics and shield layer (10,8,27).

In FIGS. 12A and 12B, different polarizations of light can reach different eyes, so as to include both monocular depth cues as well as stereopsis. The polarization is switched by an LC layer on top of the higher-frame-rate display such that frames are sent to the left eye and right eye alternatively. In both figures, the emissive display might be arbitrarily engineered. It might be curved, autostereoscopic, macroformed, or have an FEC or an OFEC on it or around it. The difference between FIGS. 12A and 12B is that in FIG. 12A, the light from the emissive display travels to the PBS or beam splitter and the to a curved reflector, and it is gated based on the layers in front of each eye so that only one monocular depth is present. However, in FIG. 12B, the display is at the bottom, very much like the embodiment FIG. 3A, and there is a switchable mirror stack on top that not only increases the eyebox, but also provides multiple monocular depth layers on top of the viewed stereopsis. This is accomplished by polarization-gating with the front layers close to the eye and generating the entire lightfield with a large binocular overlap region.

All the embodiments illustrated in FIGS. 3A through 7F can also provide left-eye/right-eye images in a headset format by using an alternating polarization and by gating the polarization per eye with polarization elements (10,8,27), as indicated in FIGS. 12A and 12B. In some embodiments, the polarization may not be alternating in time at all but might be provided by two displays that are inserting the light in perpendicular polarizations onto a beam splitter that is then placed as the input emissive display in the enclosure, similar to the enclosure (71) in FIG. 6H. This allows all the layers to be passive, so there is no need for temporal switching if desired. In FIG. 12C, multiple gates are controlled by a headtracking camera (85) to shift the x- and y-polarizations across the viewable zone. An example of this imaging is shown in FIG. 12D. Here the left eye and the right eye see slightly different images, and the user experiences parallax and therefore stereopsis. The size of these vertical segments may vary depending on the desired headbox. These vertical segments are EO-shutters (32). Here, the shutters switch in sync with the left-eye/right-eye frames shown by the display. With this mechanism, all the embodiments in FIGS. 3A through 7F can also provide left-eye/right-eye images to provide stereopsis with multiple monocular depths.

Figure 13B:
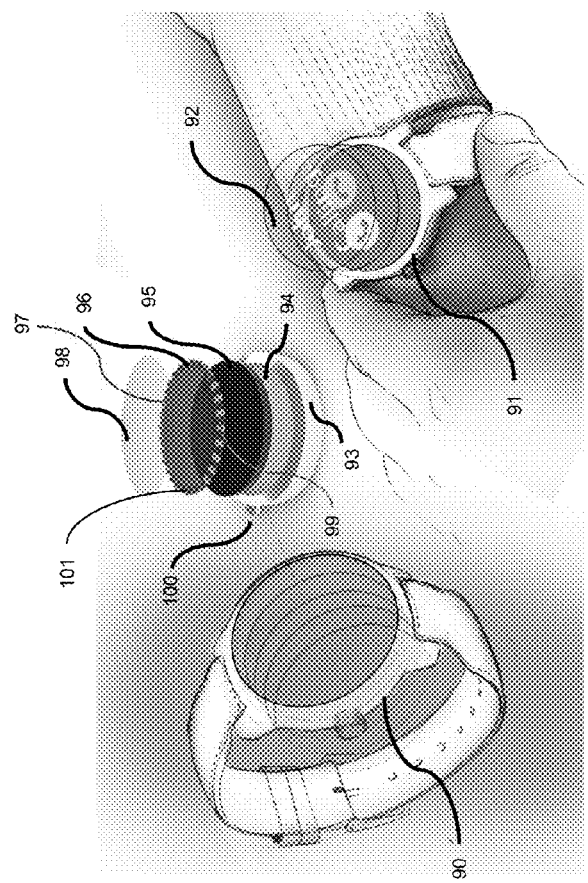
FIGS. 13A and 13B illustrate portable additional embodiments that can be implemented in automobiles or in smart devices for a variety of applications in different configurations.
Figure 13A:
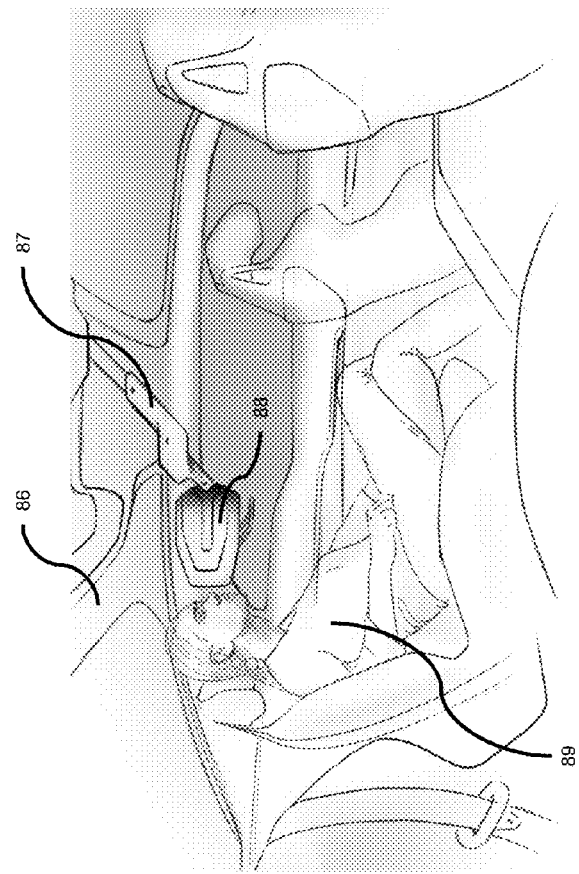

FIG. 13A shows an example embodiment as used in an automobile, or any other type of vehicle, for entertainment. In the interior 86 of the vehicle the display system can be folded up into the celling of the vehicle or cabin. A mechanical support (87) for the display system can be a folding arm that extends telescopically or can move up and down such that the display system (88) is moved to a comfortable region for the viewer, who is the passenger (89) in this example.

FIG. 13B shows the application of the above-disclosed techniques in a portable device like a smartwatch (90) that can produce different content layers (91), such that the layers appear deeper than the physical aperture (90) of the watch, or such that the images seem to hover above (91) the physical aperture, all due to combination of monocular and binocular depth mechanisms provided by the device. These techniques may be used to create a 3D image or multi-depth perception of the mechanical hands of a classic watch or to create a multi-depth user interface (92) for taking a call or interacting with a smartwatch in arbitrary applications. Element (93) is the watch body, element (94) is the driving board, and element (95) is an emissive display. In some embodiments, the display might be macroformed; in some embodiments, the display may have a functional coating to increase the light efficiency of the optical layers that are deposited on the display. Elements (96) and (101) are transducer arrays for 1D macroforming of the QBQ layer, and elements (97) and (99) are the transducer arrays for 1D macroforming the PBS layer in a direction perpendicular to the deeper QBQ layer. There is a buffer PMMA or transparent elastic polymer layer between the QBQ and PBS. Element (98) is the protective durable touch glass covering the system. Element (100) is a functional button for interfacing with the watch or smartwatch. The same or similar architecture can be used in smartphones, tablets, TVs, or any other display in any application. For smaller devices, this approach is more appropriate because the macroformed layers experience less loss over shorter distances.

Figure 13C:
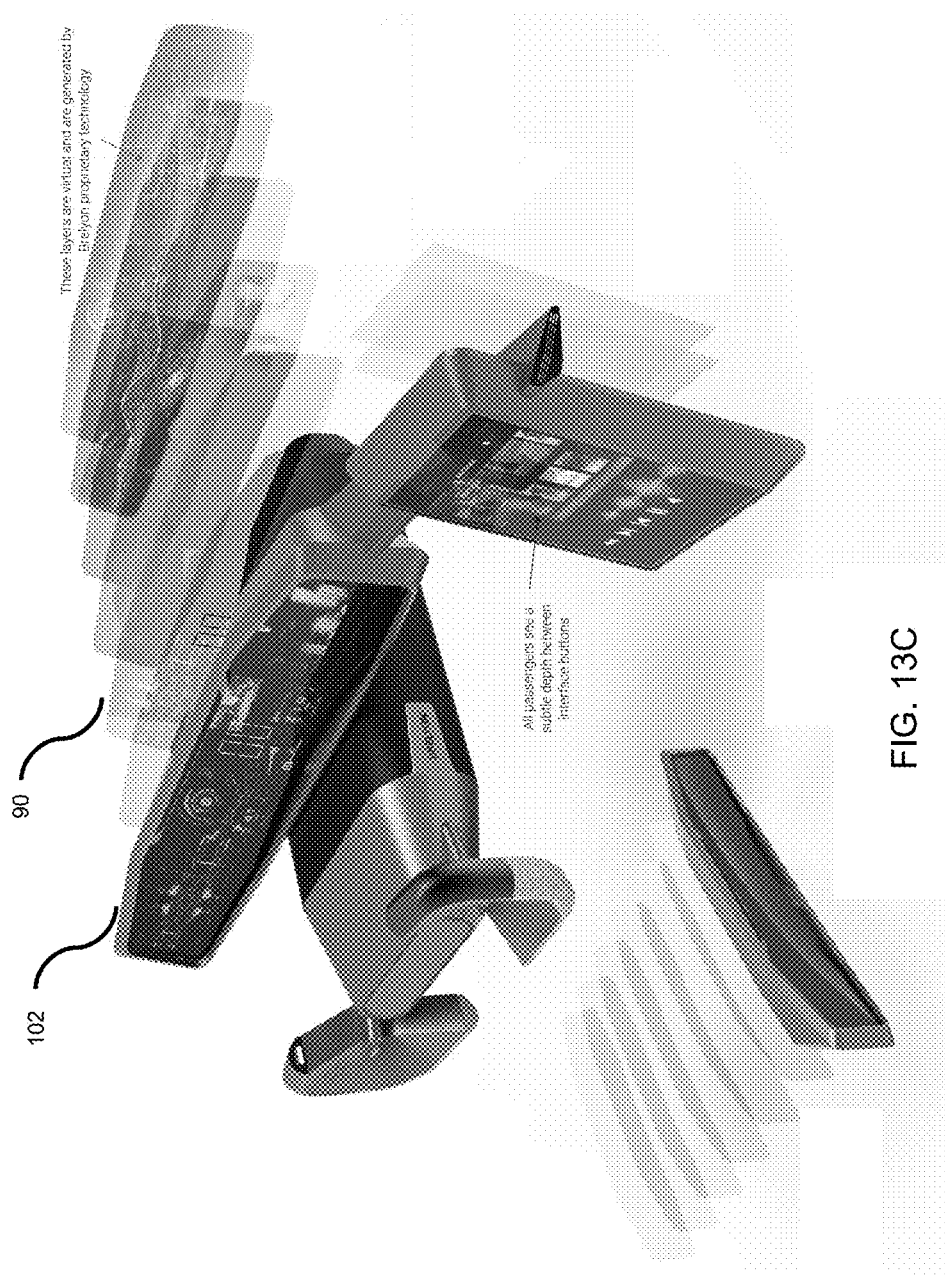

FIG. 13C shows the implication of techniques introduced here for in-car dashboard applications. Here, element (102) is the car odometer or digital interface layer. Elements (90) are the virtual image layers that are sunken into the display system, away from the driver or operator of the vehicle. These images appear to the driver to be located at deeper depth layers, beyond the physical location of the display. In some embodiments, the disclosed methods can be used to bring two or multiple layers of depth into a tablet interface inside the vehicle such that the interaction buttons appear to be popping out of, or sunken into, the touch screen. In some embodiments, the car's odometer may appear closer than the map, or there might be a multi-layer interface shown in the instrument cluster. In some embodiments, the depths of layers might be significantly different such that the close layers are a few centimeters away from the user, but the deeper layers are optically a few meters away. This disparity reduces the driver's eye fatigue or eye adjustments while alternating looking at the road and then at the instrument cluster.

All the displays, architectures, and systems may be made semi-transparent by adjusting the reflectivity of the curved back reflector in the disclosed architectures or by projecting the output of the display aperture onto the windshield. FECs of the multilayer display types (42) or (50) might be bent behind the tablet or be inserted at the front of the dashboard to conceal the size of the device or to allow further depth without adding curved or freeform elements. In some embodiments, a retroreflective layer might be used or even deposited onto the surface of the emissive display to make the images appear as if they are popping out of the aperture instead of sinking into it. In all embodiments, the optical distance from the freeform or lensing elements might be longer than the focal length so that the image appears to be hovering in front of the aperture as opposed to sinking into it. In automotive applications, instrument clusters with such hovering or protruding images might be used for a touchless interface with the vehicle.

Figure 14:
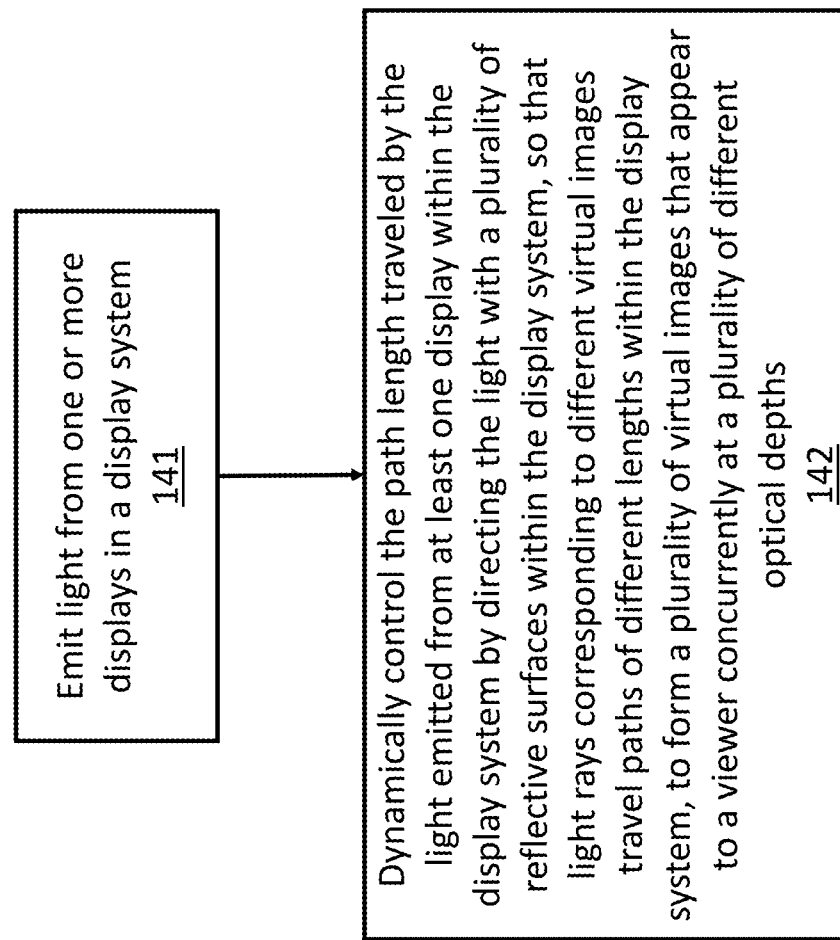
FIG. 14 is a flowchart illustrating a process associated with the techniques introduced here.

FIG. 14 illustrates a process associated with the techniques introduced here, to generate 3D images in a display system. At step 141, the process emits light from one or more displays in the display system. At step 142, the process dynamically controls the path length traveled by the light emitted from at least one display within the display system, by directing the light with a plurality of reflective surfaces within the display system, so that light rays corresponding to different virtual images travel paths of different lengths within the display system, so as to form a plurality of virtual images that appear to a viewer concurrently at a plurality of different optical depths. It will be recognized that a process similar to that shown in FIG. 14 can be executed in a camera or other image sensor without step 141, to capture 3D images of a scene.

Example Embodiments

The features, aspects and characteristics of the techniques introduced and described above include, in at least certain embodiments, the following examples:

General and Embodiment A

1. A display system comprising:
a display to emit or transmit light; and
an optical subsystem optically coupled to the display and including a reflector and a semi-reflective optic, wherein the optical subsystem is configured to redirect light rays to form a plurality of virtual images that appear to a viewer concurrently at a respective plurality of different optical depths, by causing light of each of the virtual images to travel a different distance or direction within the optical subsystem before exiting the optical subsystem on a path to the viewer.

2. A display system as recited in example 1, wherein a path that light representing at least one of the virtual images travels within the optical subsystem is at least partially folded onto itself.

3. A display system as recited in example 1 or example 2, wherein the plurality of optical depths represents a plurality of monocular depths, wherein the light corresponding to different objects within an image are directed along different paths as decided by an optimization algorithm.

4. A display system as recited in any of examples 1 through 3, wherein the reflector is a 2D-curved reflector located at a back of the optical subsystem.

5. A display system as recited in any of examples 1 through 4, wherein the semi-reflective optic comprises a polarized optic that is transmissive and reflective dependent on polarization of the light.

6. A display system as recited in any of examples 1 through 5, wherein the semi-reflective optic is disposed at an acute angle relative to the display and wherein a final shield layer extinguishes unwanted stray light rays from reaching the viewer.

7. A display system as recited in any of examples 1 through 6, wherein the optical subsystem further comprises a multilayer stack of reflective elements configured to reflect light concurrently at each of a plurality of depths so as to form the plurality of virtual images at the plurality of optical depths relative to the viewer.

8. A display system as recited in any of examples 1 through 7, wherein the multilayer stack of reflective elements is dynamically tunable during operation of the display system.

9. A display system as recited in any of examples 1 through 8, wherein the multilayer stack is electrically switchable in one or more of: polarization, reflectivity, or absorptive property, and wherein the multilayer stack is electrically switchable per pixel of the display so as to form a variation of depths across a virtual image addressable to each pixel or pixel group at a particular time.

10. A display system as recited in any of examples 1 through 9, wherein the multilayer stack of reflective elements comprises an electro-optical reflector stack (EORS) that includes a plurality of reflective layers, the EORS being operable to select any of the plurality of reflective layers to be reflective at a particular time.

11. A display system as recited in any of examples 1 through 10, wherein at least one of the layers is independently controlled by a first computer that is separate from a second computer used by the viewer, so as to show images that are fed from the first computer to the viewer depending on an action that the viewer takes on the first computer.

12. A display system as recited in any of examples 1 through 11, wherein:
the reflector is a 2D-curved reflector located at a back of the optical subsystem;
the optical subsystem further comprises a tunable multilayer stack of reflective layers disposed opposite to the display;
the semi-reflective optic is disposed in an optical path between the display and the tunable multilayer stack of reflective layers and is positioned at an acute angle relative to the display and the tunable multilayer stack of reflective layers.

13. A display system as recited in any of examples 1 through 12, wherein the reflector, the tunable multilayer stack and the semi-reflective optic collectively form, at least in part, a field evolving cavity (FEC), the FEC having optical characteristics such that when the display system is in operation, the light rays from the display pass through the semi-reflective optic to the tunable multilayer stack of reflective layers, are reflected by at least one of the reflective layers of the tunable stack of reflective layers toward the polarized optic, are reflected by the polarized optic reflector toward the reflector, are reflected by the reflector toward the semi-reflective optic, and are passed through the polarized optic toward the eyes of the viewer.

Embodiment B

14. A display system as recited in example 1, wherein the reflector is a back reflector located at a back of the optical subsystem, wherein the semi-reflective optic has a first segment that partially reflects light from the display to the back reflector, and wherein the semi-reflective optic has other segments that interact with the light from the display differently such that a distance from a center height of the angled semi-reflector to a center height of the back reflector is less than one third of a total height of the back reflector.

15. A display system as recited in example 14, wherein the semi-reflective optic is one of two polarization-dependent semi-reflectors that form a wedge-like structure, with one semi-reflector parallel to the back reflector and the other being disposed at an acute angle with the first semi-reflector such that the light strikes the back reflector after two reflections within the wedge-like structure.

16. A display system as recited in example 14 or example 15, wherein the semi-reflective optic is temporally modulated by a mechanical actuator or transducer array to vary the direction of the light rays incident at different segments of the semi-reflective optic.

17. A display system as recited in any of examples 14 through 16, wherein the optical subsystem includes a plurality of perpendicular reflective pieces to tessellate an image to the back reflector and thereby to increase a vertical or horizontal field of view to the viewer by an amount related to a quantity of the perpendicular reflectors.

18. A display system as recited in any of examples 14 through 17, wherein two mechanically-actuated or acoustically-actuated semi-reflective layers are placed in front of the back reflector and in a near-parallel orientation to the back reflector and have input into them light from two displays, located respectively on the top and bottom of a sensor, so as to form an image guide to raster a cohesive image across the back reflector by synchronizing acoustic vibrations with a rastered line on each of the displays.

19. A display system as recited in any of examples 14 through 18, wherein the semi-reflective optic comprises a convex curvature facing the back reflector, and wherein the back reflector has a free-form optical function co-designed with the convex curvature so as to deliver a desired monocular depth to the viewer.

20. A display system as recited in any of examples 14 through 19, wherein the display is located at a bottom of the display subsystem, and light from the display is transmitted through the semi-reflective optic once, is reflected by a mirror, and is then reflected by the semi-reflector to the back reflector.

21. A display system as recited in any of examples 14 through 20, wherein light from the display is input to the semi-reflective optic by a field evolving cavity (FEC), wherein the FEC comprises a plurality of displays or varying depths, so as to create multiple depth layers.

Embodiment C

22. A display system as recited in example 1, wherein:
the display is a first display, the display system further comprising a second display arranged to emit or transmit light rays toward the semi-reflective optic, the semi-reflective optic being disposed between the first display and the second display; and the semi-reflective optic is configured to cause light from the first display to travel a first path within the optical subsystem, and to cause light from the second display to travel a second path within the optical subsystem, such that a difference in lengths between the first path within the optical subsystem and the second path within the optical subsystem results in a viewer perception of multiple concurrent images at different depths.

Embodiment D

23. A display system as recited in example 1, wherein:
the reflector is a first 1D reflector; and
the display system further comprises a second 1D reflector disposed orthogonally to the first 1D reflector, and
the semi-reflective optic is disposed between the display and the second 1D reflector.

24. A display system as recited in example 23, wherein at least one of the first 1D reflector or the second 1D reflector forms a 1D-1D reflector in which a combination of perpendicular optical powers or optical functions emulates a 2D curved reflector.

25. A display system as recited in example 24 or example 25, wherein at least one of the first 1D reflector or the second 1D reflector has subwavelength structure or a Fresnel structure, or is a diffractive grating, so as to form a 1D-1D reflector that emulates a 2D curved reflector.

26. A display system as recited in any of examples 23 through 25, wherein in the semi-reflective optic is a 1D-1D semi-reflector.

27. A display system as recited in any of examples 23 through 26, wherein the first 1D reflector and the second 1D reflector are temporally modulated mechanically or electro-optically.

28. A display system as recited in any of examples 23 through 27, wherein the first 1D reflector and the second 1D reflector form a pancake lens structure or FEC structure so that time-varying mechanical waves or segmented addressable electrooptical parts can impact a directionality and monocular depth of a generated image spatially and temporally in a programmable fashion.

GENERAL

29. A display system as recited in any of examples 1 through 28, wherein the semi-reflective optic is a switchable reflector, switching of which causes light from the display to travel different path lengths in the optical subsystem.

30. A display system as recited in any of examples 1 through 29, wherein the one or multiple display panels are replaced by projectors to give directionality or autostereopsis or to provide a geometrically compensated 2D image.

31. A display system as recited in any of examples 1 through 30, wherein light from the display propagates through an electro-optical layer to sequentially vary the polarization of the light, or where different displays feed the optical subsystem with different polarizations with equal optical path.

32. A display system as recited in any of examples 1 through 31, wherein an aperture of the display system has a plurality of polarization-dependent segments, such that each eye of the viewer sees a different image from the aperture and such that stereopsis thereby is perceived by the viewer in addition to monocular depth.

33. A display system as recited in any of examples 1 through 32, wherein an aperture of the display system has a plurality of polarization-dependent segments that are switched on and off, and wherein the display system is operable to be coupled with a head-tracking or eye-tracking camera facing the viewer such that each eye of the viewer sees a different image from the aperture while the head of the viewer is moving and such that stereopsis is thereby perceived by the viewer in addition to monocular depth.

34. A display system as recited in any of examples 1 through 33, wherein the display panels are replaced by image sensors to provide cameras capturing part or all of the light field in multiple focal planes, zoom settings, or angles.

35. A display system as recited in any of examples 1 through 34, wherein the display system is a wearable display for virtual reality or augmented reality applications.

36. A display system as recited in any of examples 1 through 35, wherein the display system is a wearable or portable display designed to be worn on a wrist of the viewer and configured to provide a multi-depth user interface.

37. A display system as recited in any of examples 1 through 36, wherein the display system is an in-vehicle display system configured to provide panoramic entertainment in a vehicle, wherein the display system can be folded into and out of a body of the vehicle with a foldable arm.

38. A display system as recited in any of examples 1 through 37, wherein the display is used for providing a multi-depth or 3D instrument cluster in the vehicle or for user interfacing in the vehicle.

39. A display system as recited in any of examples 1 through 38, wherein the reflector is replaced by a retroreflective mechanism or surface so that the virtual layers appear closer to the user, beyond the aperture, rather than farther from the user, behind or within the display system.

40. An optical subsystem for use in a display system or an imaging system, the optical subsystem comprising:
a plurality of reflective surfaces collectively arranged to provide variable control of device-internal path lengths of light coming to an imaging sensor or traveling a path to an eye of a viewer.

41. An optical subsystem as recited in example 40, wherein the plurality of reflective surfaces provide variable control of lensing and directionality of light coming to an imaging sensor or traveling a path to the eye of the viewer.

42. An optical subsystem as recited in example 40 or example 41, wherein when the optical subsystem is included within a display system, and the variable control of device-internal path lengths of light is operable to form a plurality of virtual images that appear to a viewer concurrently at a respective plurality of different optical depths, by causing light of each of the virtual images to travel a different distance within the display system before exiting the display system on the path to the eye of the viewer.

43. An optical subsystem as recited in any of examples 40 through 42, wherein a distance from a front surface of an aperture of the display system facing the viewer to a farthest point at a back of the display system is less than half a focal length of the display system at a maximum magnification of the display system.

44. An optical subsystem as recited in any of examples 40 through 43, wherein the plurality of reflective surfaces further comprise a tunable multilayer stack of reflective elements configured to reflect light concurrently at each of a plurality of depths so as to form the plurality of virtual images at a plurality of optical depths relative to the viewer or so as to create a plurality of focal planes or optical zoom settings for the imaging sensor.

45. A display system as recited in any of examples 1 through 39, wherein a polarization-dependent diffuse optic is located between the display surface and the semi-reflective optic to scatter some light so as to create a transparent depth layer.

What is claimed is:
1. A display system comprising:
a display to emit or transmit light; and
an optical subsystem optically coupled to the display and including a reflector and a semi-reflective optic, wherein the optical subsystem is configured to redirect light rays to form a plurality of virtual images that appear to a viewer concurrently at a respective plurality of different optical depths, by causing light of each of the virtual images to travel a different distance or direction within the optical subsystem before exiting the optical subsystem on a path to the viewer, wherein the semi-reflective optic is disposed at an acute angle relative to the display and wherein a final shield layer extinguishes unwanted stray light rays from reaching the viewer.

2. A display system as recited in claim 1, wherein a path that light representing at least one of the virtual images travels within the optical subsystem is at least partially folded onto itself.

3. A display system as recited in claim 1, wherein the reflector is a 2D-curved reflector located at a back of the optical subsystem.

4. A display system as recited in claim 1, wherein the semi-reflective optic comprises a polarized optic that is transmissive and reflective dependent on polarization of the light.

5. A display system as recited in claim 1, wherein the optical subsystem further comprises a multilayer stack of reflective elements configured to reflect light concurrently at each of a plurality of depths so as to form the plurality of virtual images at the plurality of optical depths relative to the viewer.

6. A display system as recited in claim 5, wherein the multilayer stack of reflective elements is dynamically tunable during operation of the display system.

7. A display system as recited in claim 5, wherein the multilayer stack is electrically switchable in one or more of: polarization, reflectivity, or absorptive property, and wherein the multilayer stack is electrically switchable per pixel of the display so as to form a variation of depths across a virtual image addressable to each pixel or pixel group at a particular time.

8. A display system as recited in claim 5, wherein at least one of the layers is independently controlled by a first computer that is separate from a second computer used by the viewer, so as to show images that are fed from the first computer to the viewer depending on an action that the viewer takes on the first computer.

9. A display system as recited in claim 1, wherein:
the reflector is a 2D-curved reflector located at a back of the optical subsystem;
the optical subsystem further comprises a tunable multilayer stack of reflective layers disposed opposite to the display;
the semi-reflective optic is disposed in an optical path between the display and the tunable multilayer stack of reflective layers and is positioned at an acute angle relative to the display and the tunable multilayer stack of reflective layers.

10. A display system as recited in claim 9, wherein the reflector, the tunable multilayer stack and the semi-reflective optic collectively form, at least in part, a field evolving cavity (FEC), the FEC having optical characteristics such that when the display system is in operation, the light rays from the display pass through the semi-reflective optic to the tunable multilayer stack of reflective layers, are reflected by at least one of the reflective layers of the tunable stack of reflective layers toward the semi-reflective optic, are reflected by the semi-reflective optic toward the reflector, are reflected by the reflector toward the semi-reflective optic, and are passed through the semi-reflective optic toward the eyes of the viewer.

11. A display system as recited in claim 1, wherein:
the reflector is a first 1D reflector; and
the display system further comprises a second 1D reflector disposed orthogonally to the first 1D reflector, and the semi-reflective optic is disposed between the display and the second 1D reflector.

12. A display system as recited in claim 11, wherein at least one of the first 1D reflector or the second 1D reflector forms a 1D-1D reflector in which a combination of perpendicular optical powers or optical functions emulates a 2D curved reflector.

13. A display system as recited in claim 11, wherein at least one of the first 1D reflector or the second 1D reflector has subwavelength structure or a Fresnel structure, or is a diffractive grating, so as to form a 1D-1D reflector that emulates a 2D curved reflector.

14. A display system as recited in claim 11, wherein in the semi-reflective optic is a 1D-1D semi-reflector.

15. A display system as recited in claim 11, wherein the first 1D reflector and the second 1D reflector are temporally modulated mechanically or electro-optically.

16. A display system comprising:
a display to emit or transmit light; and
an optical subsystem optically coupled to the display and including a reflector and a semi-reflective optic, wherein the optical subsystem is configured to redirect light rays to form a plurality of virtual images that appear to a viewer concurrently at a respective plurality of different optical depths, by causing light of each of the virtual images to travel a different distance or direction within the optical subsystem before exiting the optical subsystem on a path to the viewer, wherein the plurality of optical depths represents a plurality of monocular depths, and wherein the light corresponding to different objects within an image are directed along different paths as decided by an optimization algorithm.

17. A display system as recited in claim 16, wherein:
the display is a first display, the display system further comprising a second display arranged to emit or transmit light rays toward the semi-reflective optic, the semi-reflective optic being disposed between the first display and the second display; and
the semi-reflective optic is configured to cause light from the first display to travel a first path within the optical subsystem, and to cause light from the second display to travel a second path within the optical subsystem, such that a difference in lengths between the first path within the optical subsystem and the second path within the optical subsystem results in a viewer perception of multiple concurrent images at different depths.

18. A display system comprising:
a display to emit or transmit light; and
an optical subsystem optically coupled to the display and including a reflector and a semi-reflective optic, wherein the optical subsystem is configured to redirect light rays to form a plurality of virtual images that appear to a viewer concurrently at a respective plurality of different optical depths, by causing light of each of the virtual images to travel a different distance or direction within the optical subsystem before exiting the optical subsystem on a path to the viewer, wherein the reflector is a back reflector located at a back of the optical subsystem, wherein the semi-reflective optic has a first segment that partially reflects light from the display to the back reflector, and wherein the semi-reflective optic has other segments that interact with the light from the display differently such that a distance from a center height of the semi-reflective optic to a center height of the back reflector is less than one third of a total height of the back reflector.

19. A display system as recited in claim 18, wherein the semi-reflective optic is one of two polarization-dependent semi-reflectors that form a wedge-like structure, with one semi-reflector parallel to the back reflector and the other being disposed at an acute angle with the first semi-reflector such that the light strikes the back reflector after two reflections within the wedge-like structure.

20. A display system as recited in claim 18, wherein the semi-reflective optic is temporally modulated by a mechanical actuator or transducer array to vary the direction of the light rays incident at different segments of the semi-reflective optic.

21. A display system as recited in claim 18, wherein the optical subsystem includes a plurality of perpendicular reflective pieces to tessellate an image to the back reflector and thereby to increase a vertical or horizontal field of view to the viewer by an amount related to a quantity of the perpendicular reflectors.

22. A display system as recited in claim 18, wherein two mechanically-actuated or acoustically-actuated semi-reflective layers are placed in front of the back reflector and in a near-parallel orientation to the back reflector and have input into them light from two displays, located respectively on a top and a bottom of a sensor, so as to form an image guide to raster a cohesive image across the back reflector by synchronizing acoustic vibrations with a rastered line on each of the displays.

23. A display system as recited in claim 18, wherein the semi-reflective optic comprises a convex curvature facing the back reflector, and wherein the back reflector has a free-form optical function co-designed with the convex curvature so as to deliver a desired monocular depth to the viewer.

24. A display system as recited in claim 18, wherein the display is located at a bottom of the display subsystem, and light from the display is transmitted through the semi-reflective optic once, is reflected by a mirror, and is then reflected by the semi-reflector to the back reflector.

25. A display system as recited in claim 18, wherein light from the display is input to the semi-reflective optic by a field evolving cavity (FEC), wherein the FEC comprises a plurality of displays or varying depths, so as to create multiple depth layers.

26. An optical subsystem for use in a display system or an imaging system, the optical subsystem comprising:
a plurality of reflective surfaces collectively arranged to provide variable control of device-internal path lengths of light coming to an imaging sensor or traveling a path to an eye of a viewer, wherein the plurality of reflective surfaces provide variable control of lensing and directionality of light coming to an imaging sensor or traveling a path to the eye of the viewer.

27. An optical subsystem as recited in claim 26, wherein when the optical subsystem is included within the display system, the variable control of device-internal path lengths of light is operable to form a plurality of virtual images that appear to a viewer concurrently at a respective plurality of different optical depths, by causing light of each of the virtual images to travel a different distance within the display system before exiting the display system on the path to the eye of the viewer.

28. An optical subsystem as recited in claim 26, wherein the plurality of reflective surfaces further comprise a tunable multilayer stack of reflective elements configured to reflect light concurrently at each of a plurality of depths so as to form a plurality of virtual images at a plurality of optical depths relative to the viewer or so as to create a plurality of focal planes or optical zoom settings for the imaging sensor.

* * * * *